Feb. 24, 1970     E. A. HERRON ET AL     3,497,116
SHOULDER STRAP ASSEMBLY APPARATUS AND METHOD
Filed Feb. 14, 1968     14 Sheets-Sheet 11
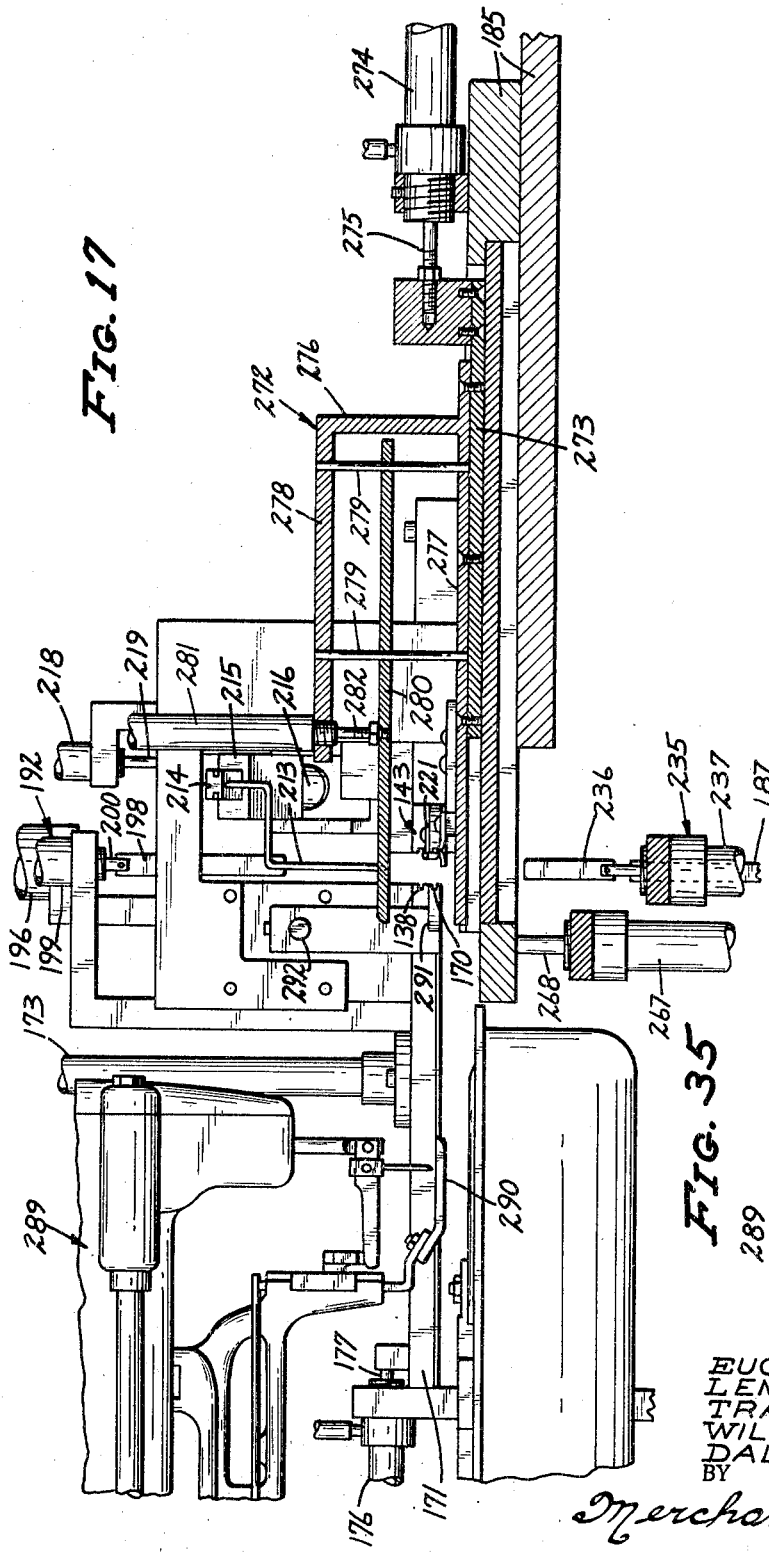
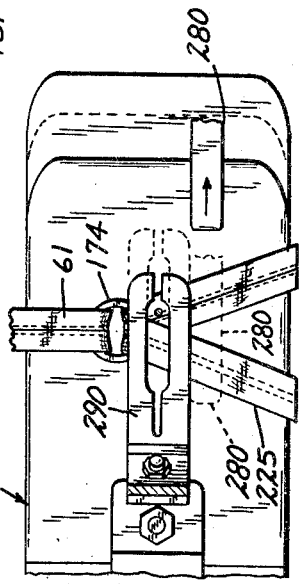
INVENTORS.
EUGENE A. HERRON
LEMOND H. HINER
TRAVIS HORTON
WILLIAM N. HAYES
DALE POSEY
BY
*Merchant & Gould*
ATTORNEYS

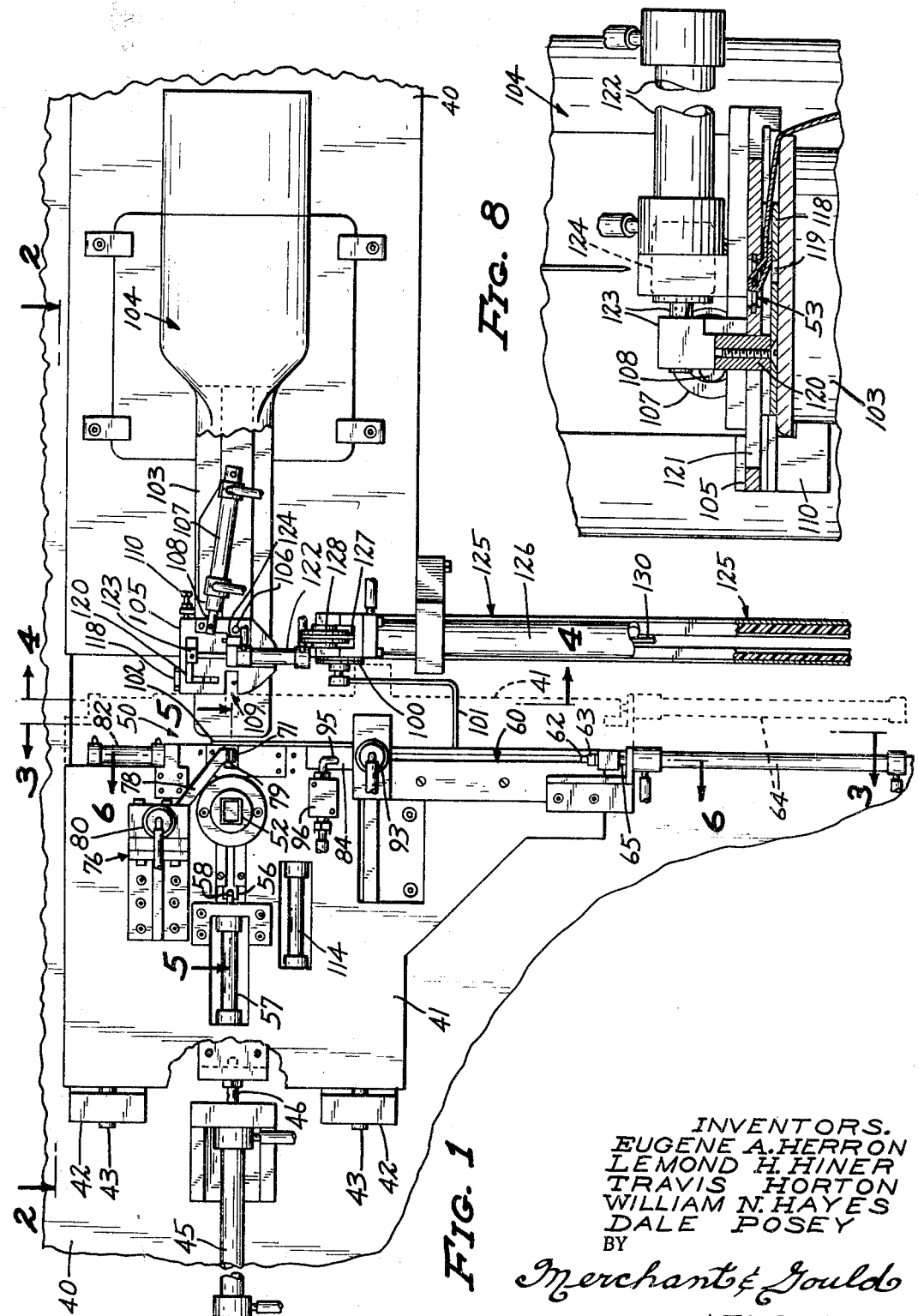

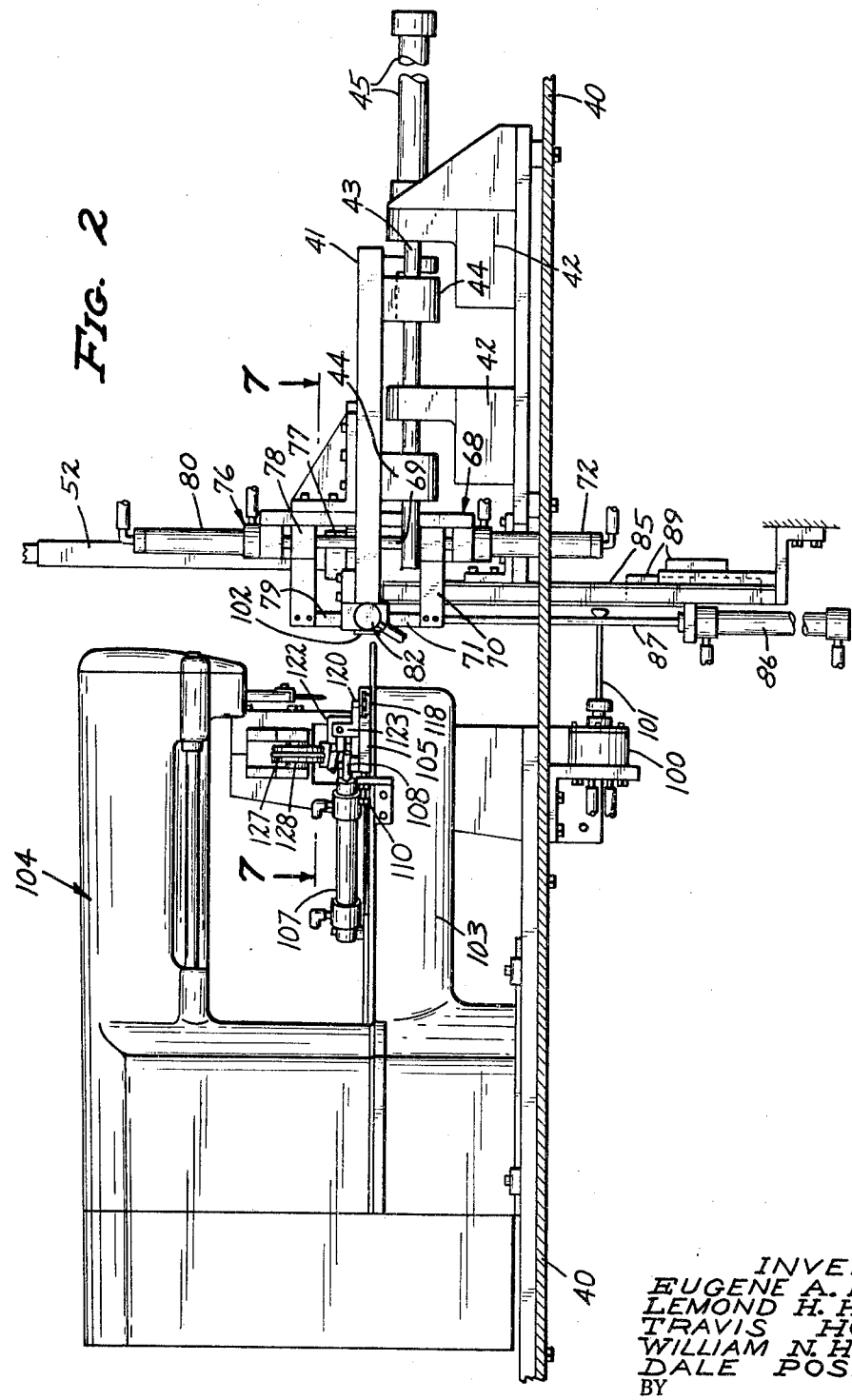

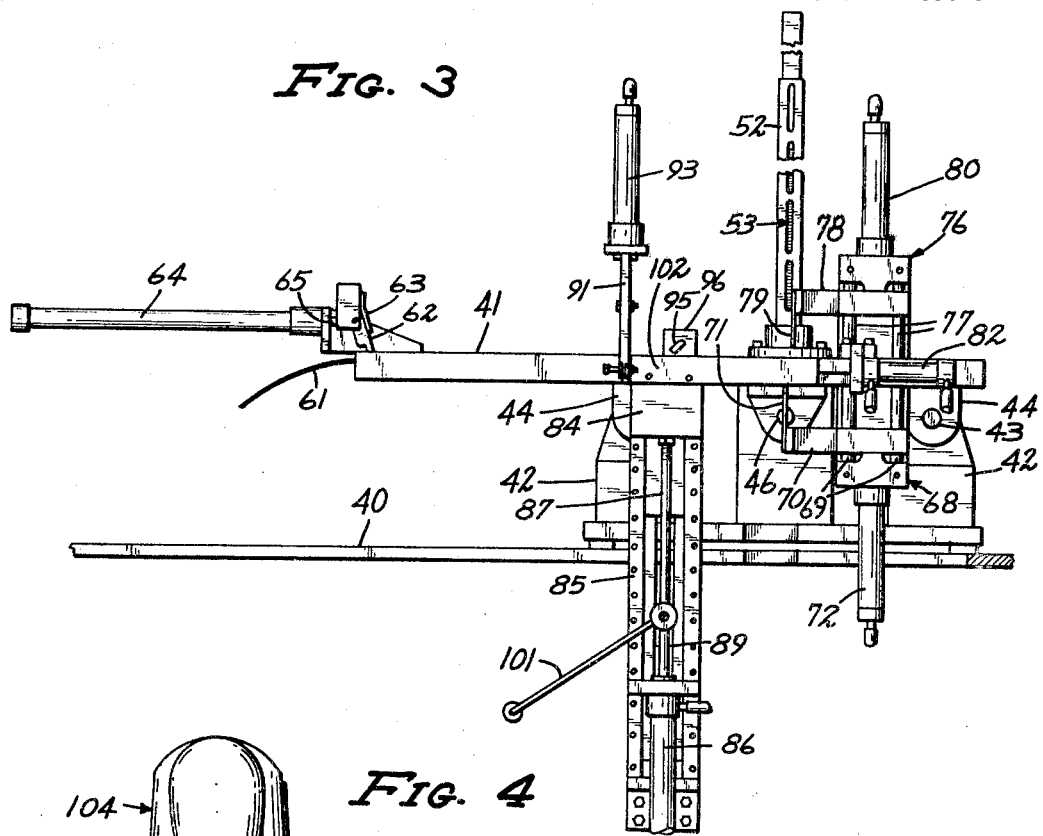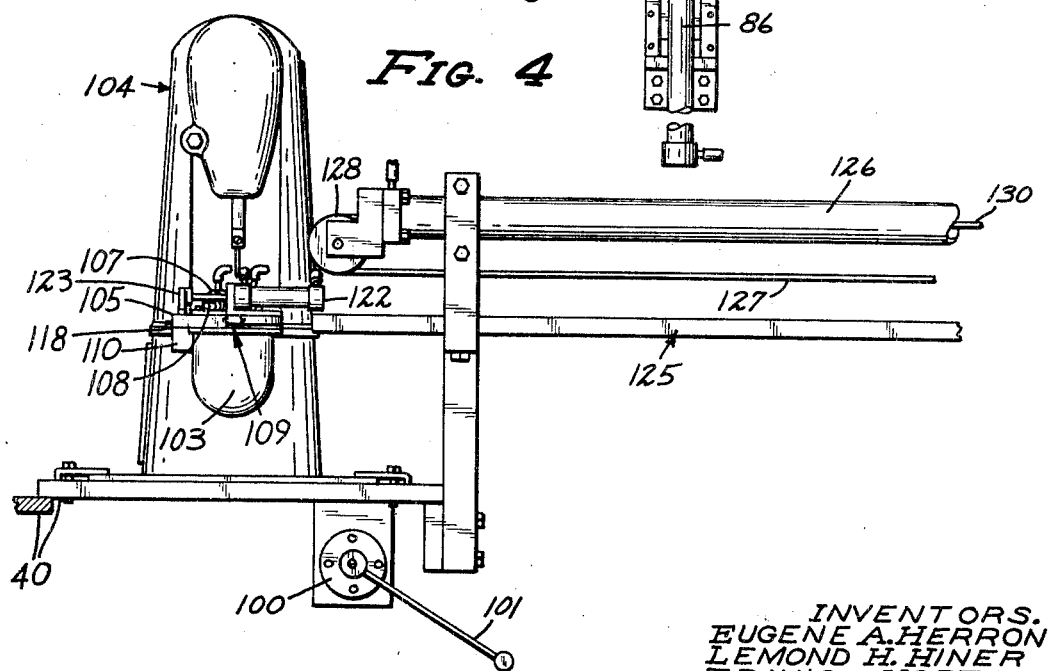

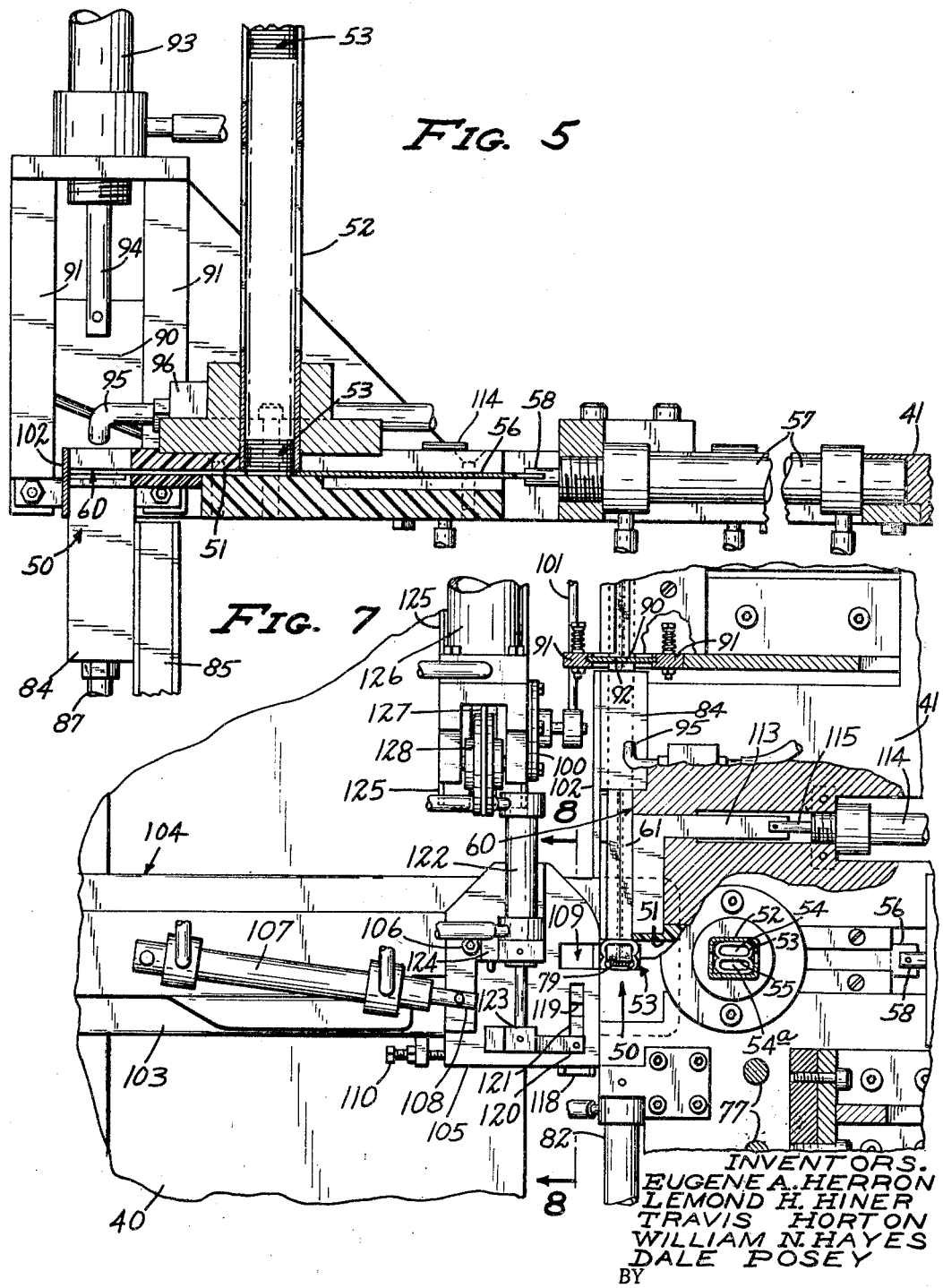

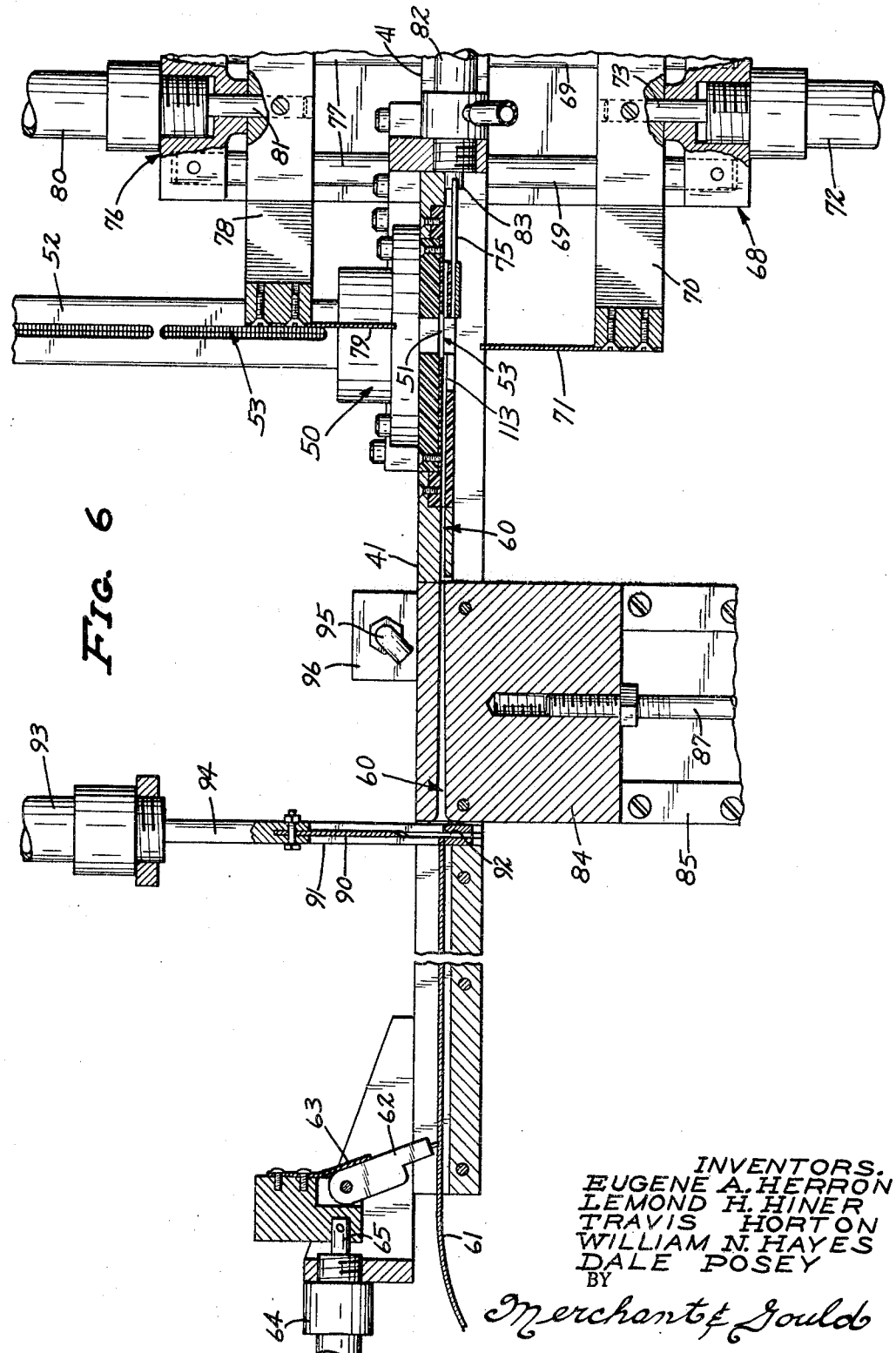

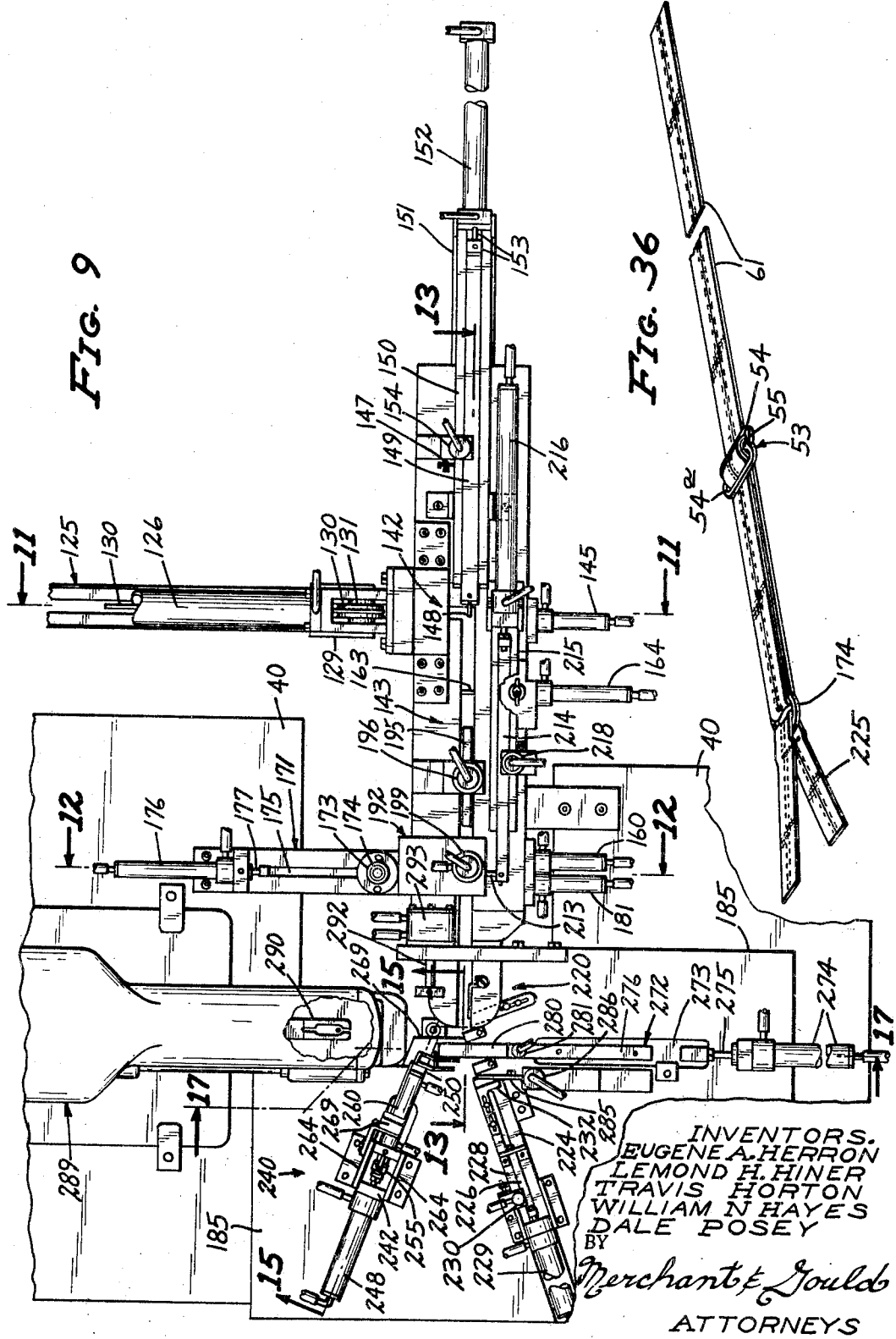

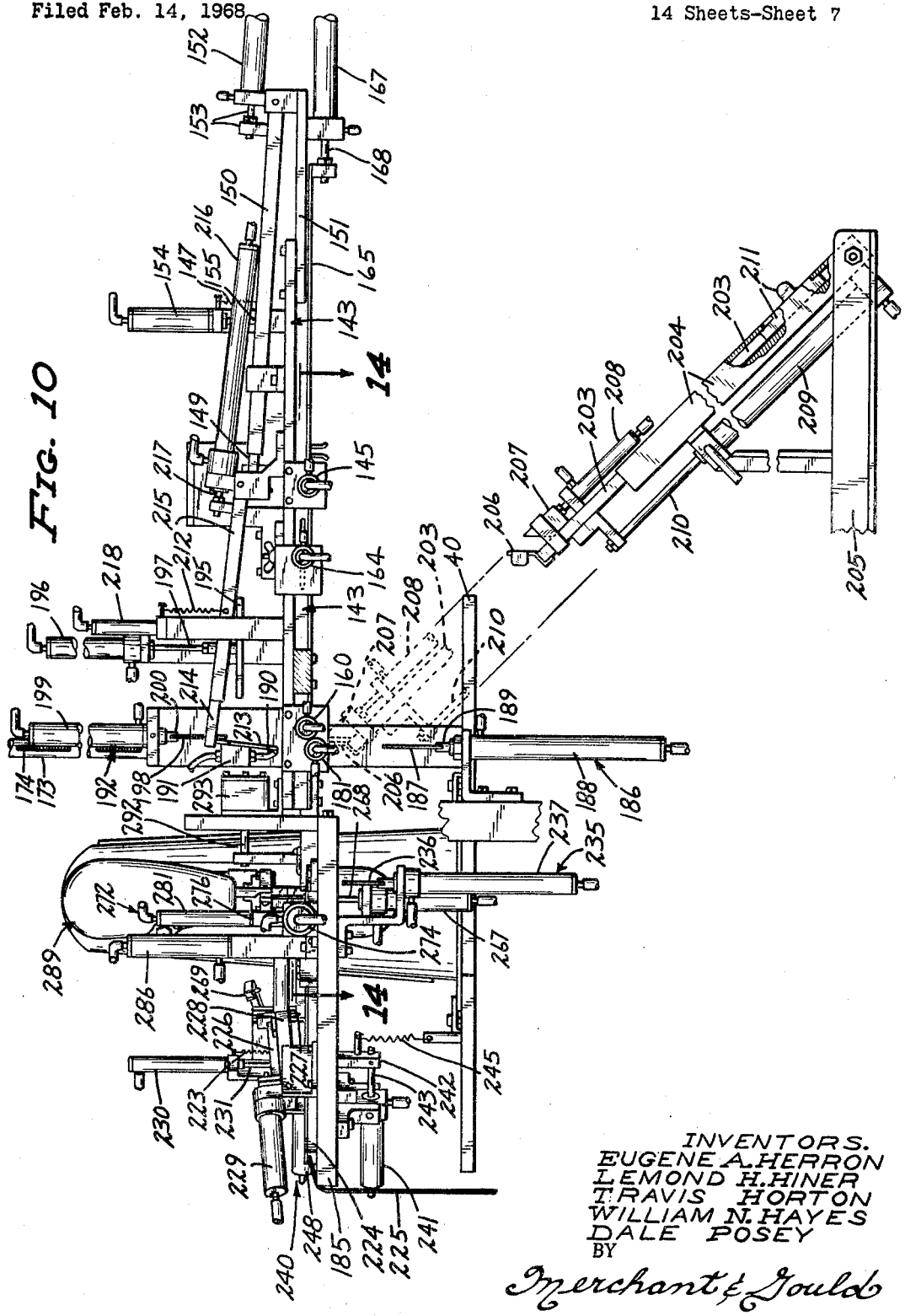

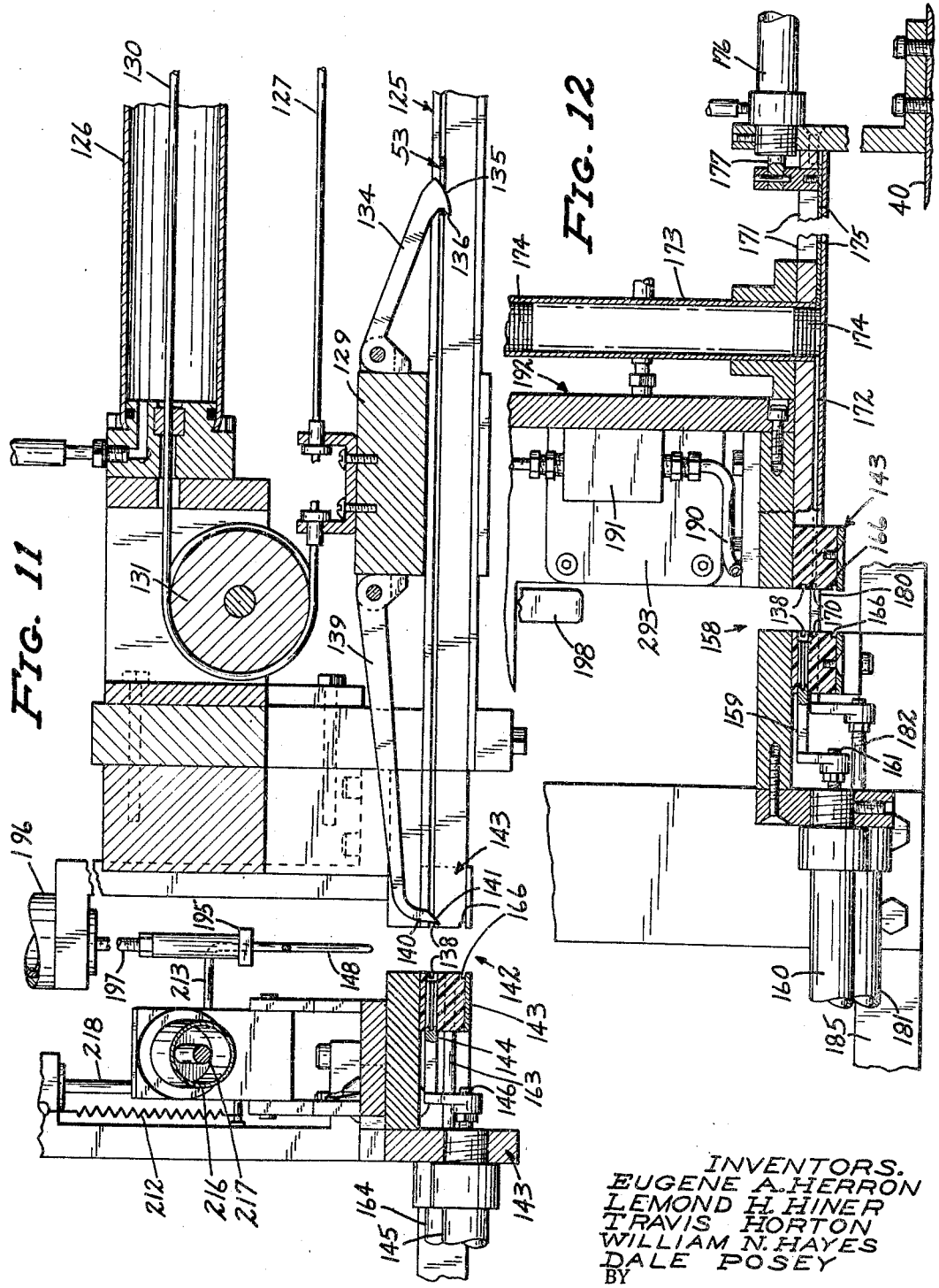

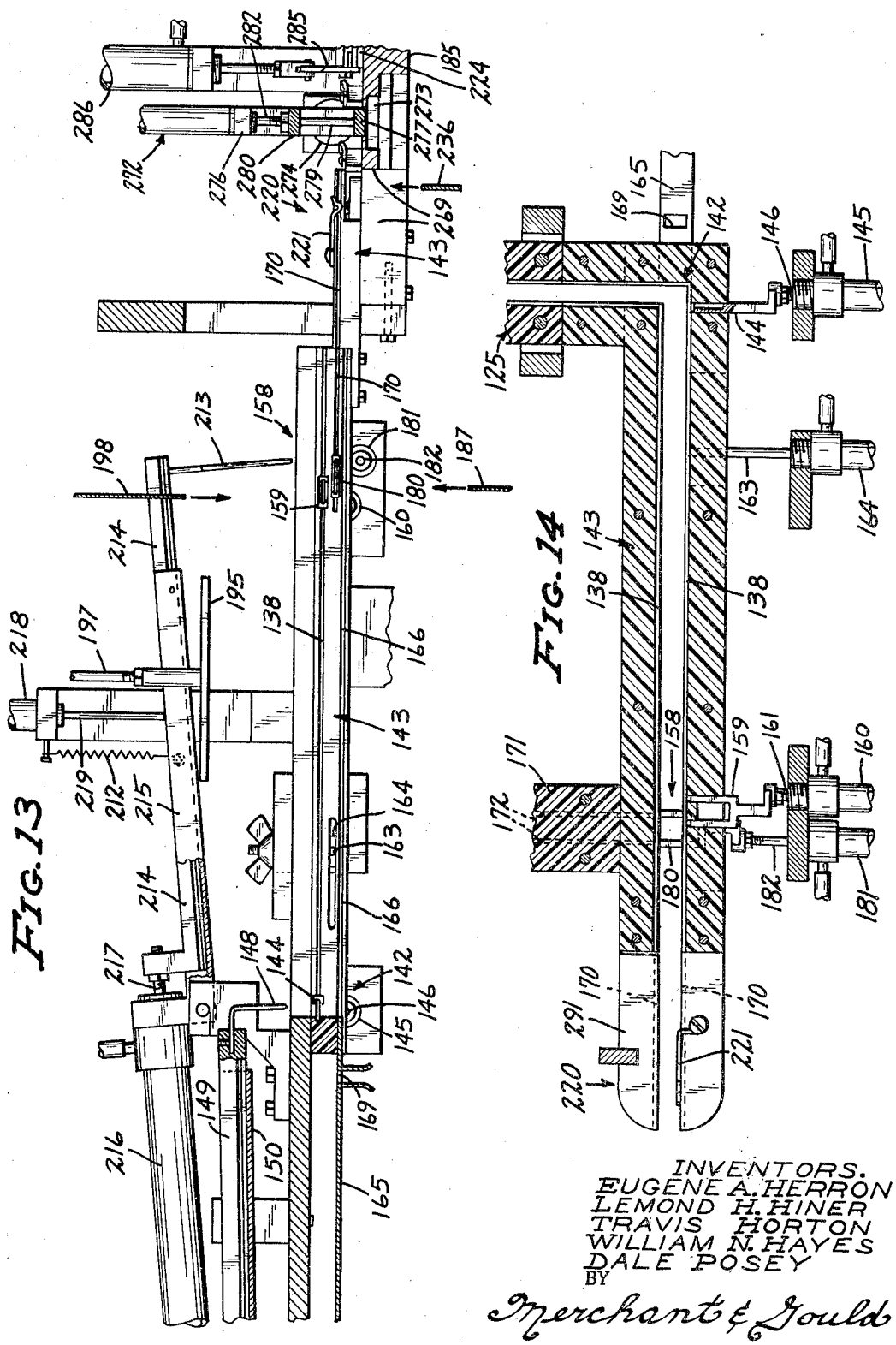

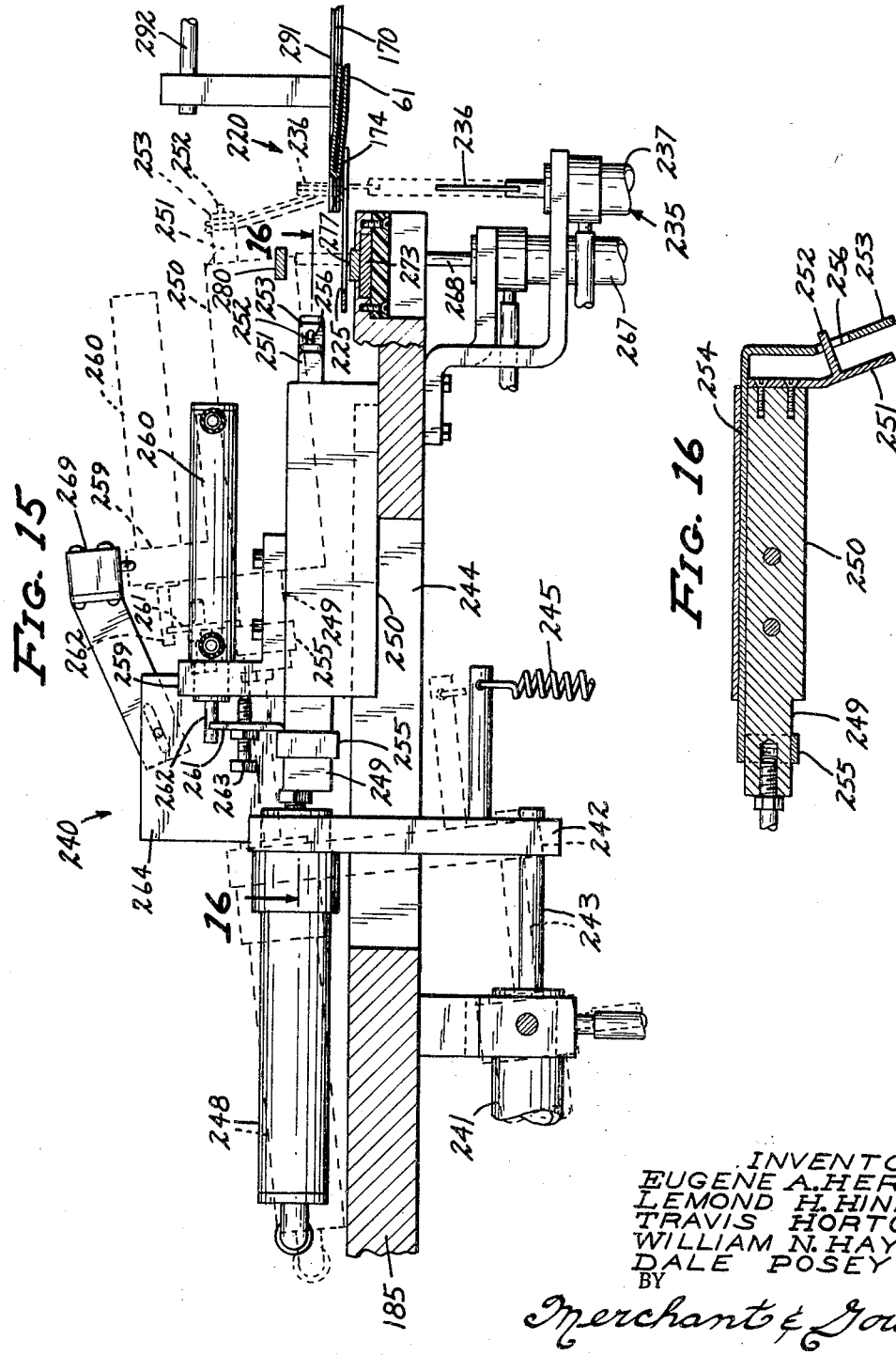

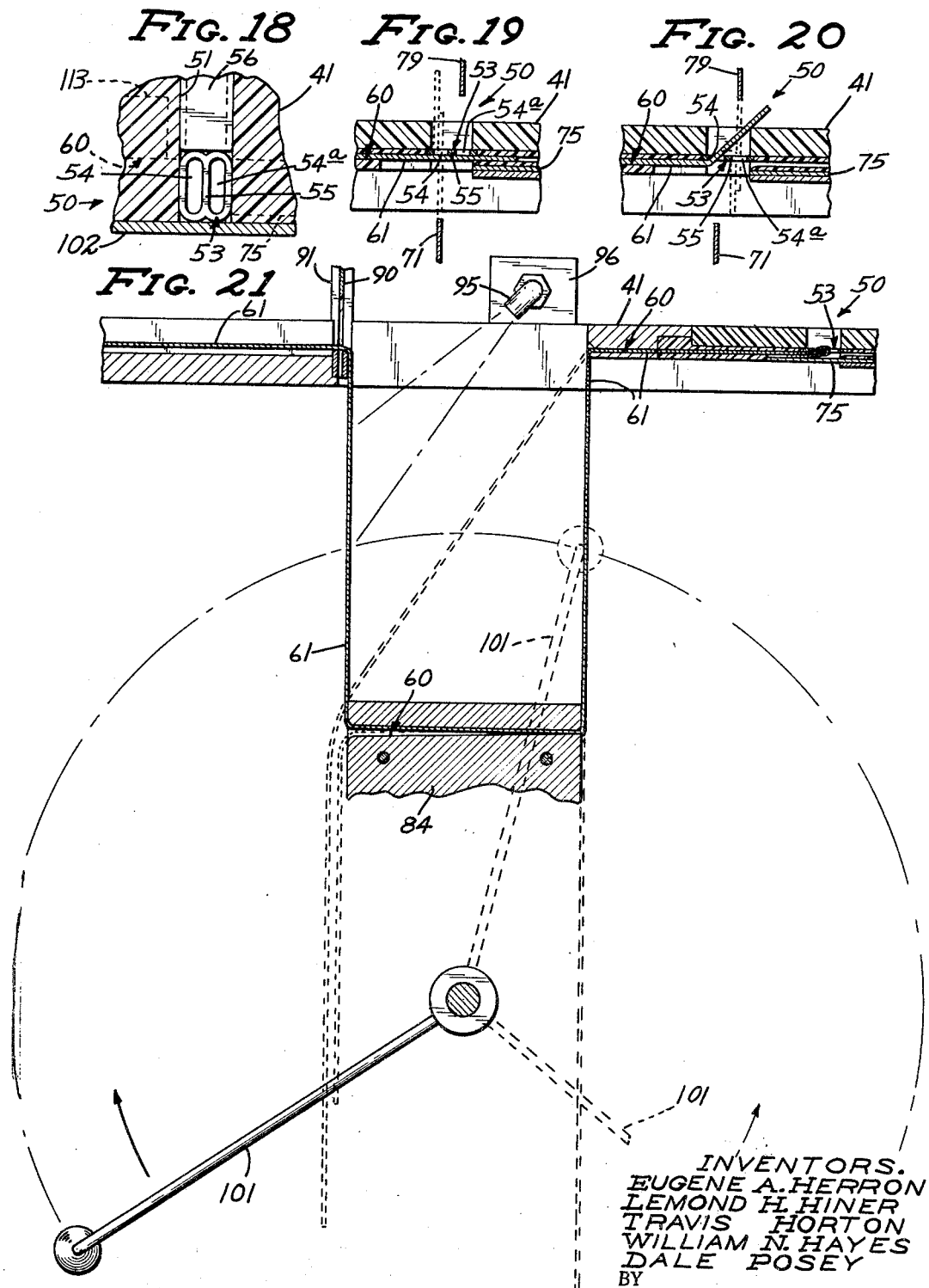

Feb. 24, 1970   E. A. HERRON ET AL   3,497,116
SHOULDER STRAP ASSEMBLY APPARATUS AND METHOD
Filed Feb. 14, 1968   14 Sheets-Sheet 13
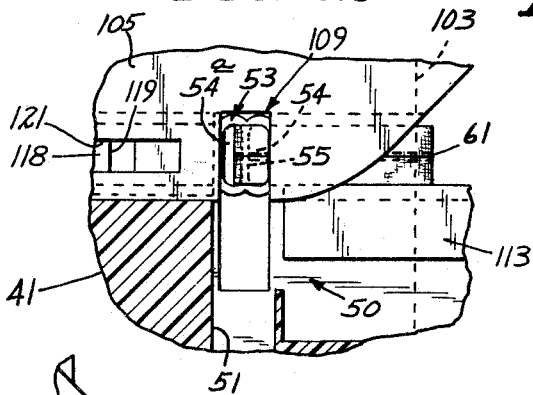
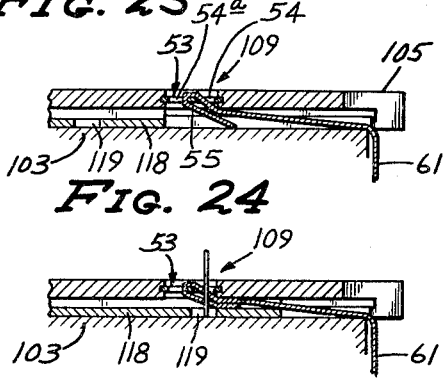
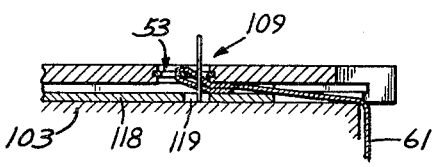
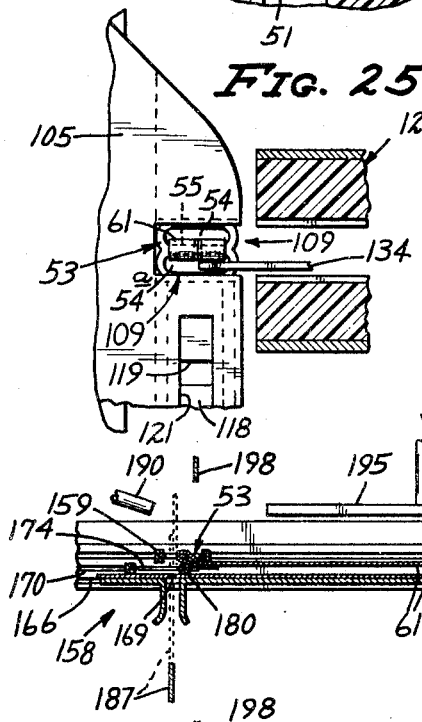
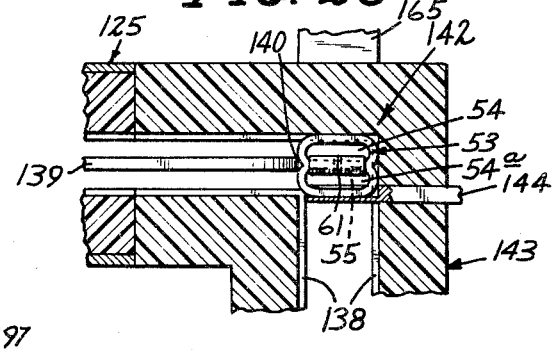
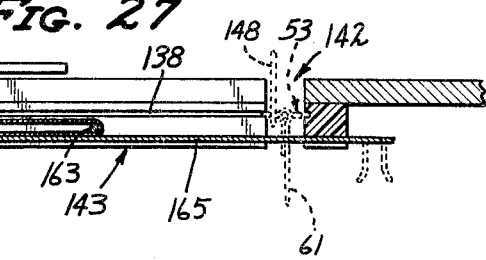
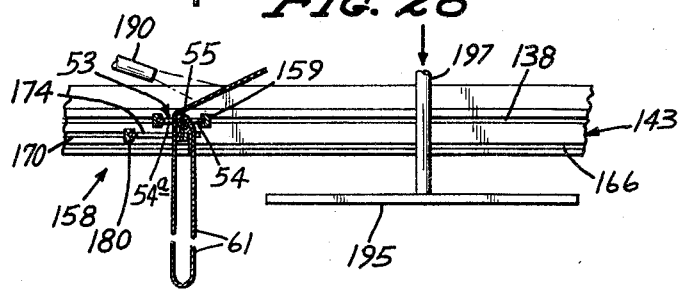
INVENTORS.
EUGENE A. HERRON
LEMOND H. HINER
TRAVIS HORTON
WILLIAM N. HAYES
DALE POSEY
BY
Merchant & Gould
ATTORNEYS

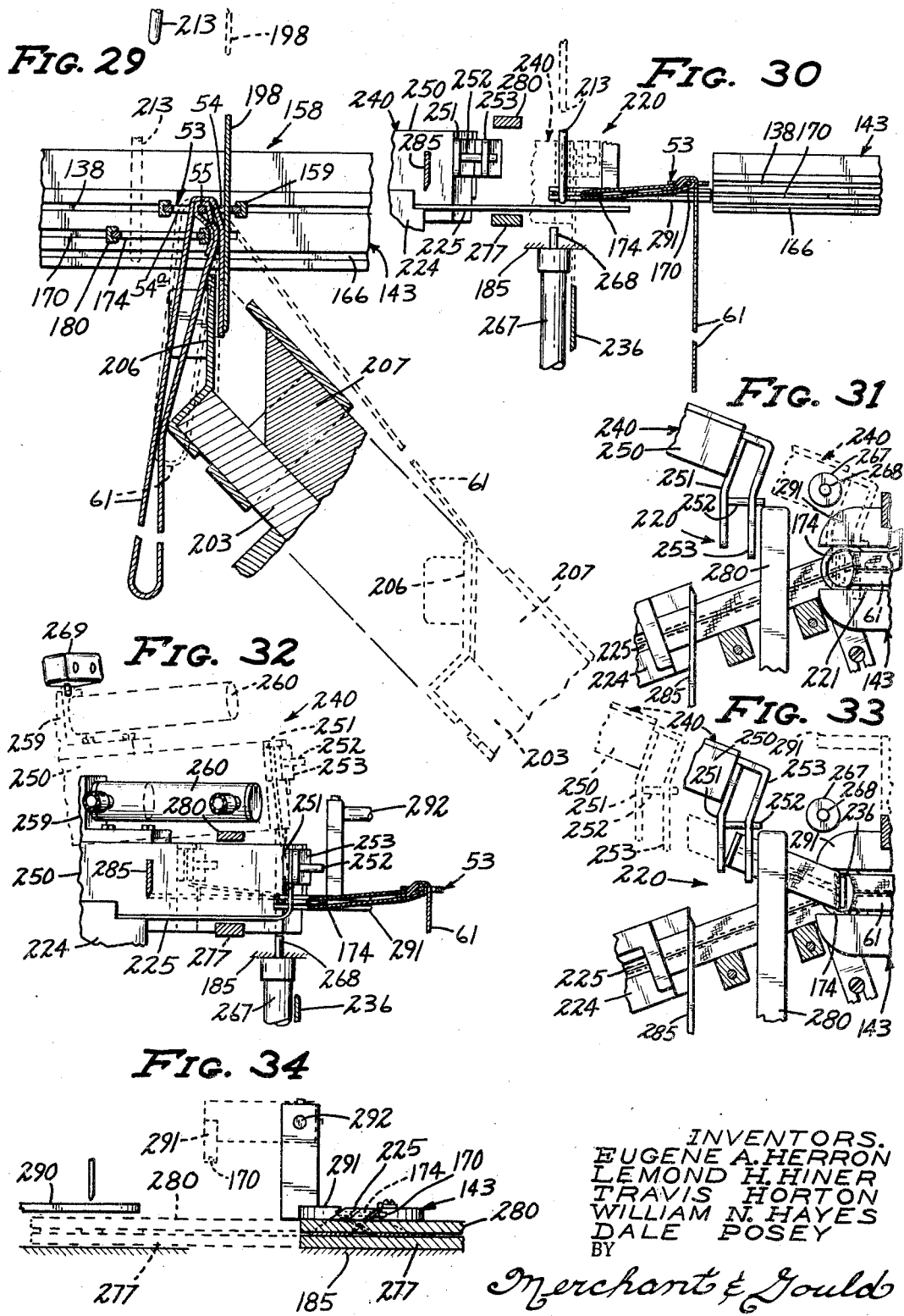

United States Patent Office 3,497,116
Patented Feb. 24, 1970

3,497,116
SHOULDER STRAP ASSEMBLY APPARATUS
AND METHOD
Eugene A. Herron, Lemond H. Hiner, and Travis Horton, Paris, Tex., William N. Hayes, Pontiac, Mich., and Dale Posey, Edina, Minn., assignors to Munsingwear, Inc., Minneapolis, Minn., a corporation of Delaware
Filed Feb. 14, 1968, Ser. No. 705,462
Int. Cl. A41h 43/00
U.S. Cl. 223—49
14 Claims

ABSTRACT OF THE DISCLOSURE

The apparatus includes first and second supplies of strap material, a magazine containing buckles having two openings therethrough and a magazine containing rings having a single opening therethrough. The apparatus further includes mechanism for sequentially performing the following steps: positioning a buckle in a first threading station; threading the free end of the first strap material through both openings of the buckle and moving the free end in juxtaposition with the body of the first strap material to encircle the portion of the buckle between the opening; measuring said first strap material to a predetermined length and severing same from said supply to produce a shoulder strap portion of a desired length; sewing said free end to the remainder of said shoulder strap portion through said first opening in said buckle; positioning a ring at a second threading station; threading the severed end of the shoulder strap portion through the buckle openings and the ring to produce an adjustable shoulder strap; grasping the severed end and drawing the shoulder strap portion through the buckle and ring to a predetermined position for obtaining a desired length of the shoulder strap portion between the buckle and the ring; threading the free end of the second strap material through the ring and positioning the portion of the second strap material leaving the ring at a predetermined angle to the portion of the second strap material entering the ring to form a fork; severing said fork from said second strap material so that the branches thereof are approximately of equal length and the ends lie in approximately a straight line; and sewing the branches of the fork together adjacent the outer periphery of the ring. Each of the moving parts is operated by a pneumatic cylinder, or the like, which in turn is energized in a predetermined sequence by timing means, such as mechanical cams or an electronic timer, to assemble a complete, adjustable shoulder strap.

BACKGROUND OF THE INVENTION

Field of the invention

In the womens' garments industry and especially in brassieres and the like a great many shoulder straps are utilized each of which must be adjustable in length and must further be comfortable without producing undue bulges and the like. Heretofore these straps have been relatively expensive because of the amount of manual labor required in assembling the same. Also, because of the number and variety of steps required in assembling a strap, the production thereof has been on a limited basis.

Description of the prior art

A great variety of machines and different styles of buckles and the like have been devised in the prior art to facilitate the assembling of straps for ladies' garments. In each instance where new buckles were developed, either the buckles produce unwarranted bulges and are uncomfortable or the adjustability of the strap is greatly hampered. Many of the machines developed are utilized in one or two steps of the assembly process so that manual labor is always required to operate the machine and/or to complete the strap. Thus, in each instance manual labor is still required and all of the disadvantages thereof are inherent in these prior art machines.

SUMMARY OF THE INVENTION

The present invention pertains to apparatus for assembling a complete, adjustable shoulder strap for women's garments wherein a buckle is automatically positioned in buckle threading means and one end of a measured length of strap is threaded therethrough and sewn into place after which the threaded buckle and a ring are positioned in a second threading station and the strap material is automatically threaded therethrough and pulled to the proper length and a second measured length of strap material is threaded through the ring, formed into a fork and sewn in place.

It is an object of the present invention to provide new and improved apparatus for assembling a complete, adjustable shoulder strap for women's garments.

It is a further object of the present invention to provide completely automatic apparatus for assembling a complete, adjustable shoulder strap.

It is a further object of the present invention to provide new and improved apparatus for threading and sewing a measured length of strap material to a buckle having a pair of openings therethrough.

It is a further object of the present invention to provide apparatus for assembling a ring and a buckle having at least two openings therethrough and a predetermined length of strap material affixed thereto into an adjustable shoulder strap.

It is a further object of the present invention to provide apparatus for assembling a connecting fork on a adjustable strap.

It is a further object of the present invention to provide a new and improved shoulder strap for women's garments and a method of producing the same.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures:

FIGURE 1 is a fragmentary view in top plan of a first portion of an apparatus utilized in the formation of a complete shoulder strap assembly for ladies' garments;

FIGURE 2 is a view partially in section and partially in side elevation as seen from the line 2—2 of FIGURE 1, portions thereof broken away;

FIGURE 3 is a sectional view as seen from the line 3—3 of FIGURE 1, portions thereof broken away;

FIGURE 4 is a sectional view as seen from the line 4—4 of FIGURE 1, portions thereof broken away;

FIGURE 5 is an enlarged sectional view as seen from the line 5—5 of FIGURE 1, portions thereof broken away;

FIGURE 6 is an enlarged sectional view as seen from the line 6—6 of FIGURE 1, portions thereof broken away;

FIGURE 7 is an enlarged horizontal sectional view as seen from the line 7—7 of FIGURE 2, portions thereof broken away and shown in section;

FIGURE 8 is an enlarged sectional view as seen from the line 8—8 of FIGURE 7, portions thereof broken away;

FIGURE 9 is a fragmentary view in top plan of a second portion of an apparatus utilized in the formation of a complete shoulder assembly strap for ladies' garments;

FIGURE 10 is a view in side elevation of the apparatus shown in FIGURE 9, as seen from right to left, portions thereof broken away and shown in section;

FIGURE 11 is an enlarged sectional view as seen from the line 11—11 of FIGURE 9, portions thereof broken away;

FIGURE 12 is an enlarged sectional view as seen from the line 12—12 of FIGURE 9, portions thereof broken away;

FIGURE 13 is an enlarged sectional view as seen from the line 13—13 of FIGURE 9, portions thereof broken away;

FIGURE 14 is an enlarged horizontal sectional view as seen from the line 14—14 of FIGURE 10, portions thereof broken away;

FIGURE 15 is an enlarged sectional view as seen from the line 15—15 of FIGURE 9, portions thereof broken away;

FIGURE 16 is a horizontal sectional view as seen from the line 16—16 of FIGURE 15;

FIGURE 17 is an enlarged sectional view as seen from the line 17—17 of FIGURE 9;

FIGURES 18 through 35 are sequential views showing the steps of forming a complete shoulder strap for ladies' garments by utilizing the apparatus disclosed in FIGURES 1 through 17; and FIGURE 36 is a view in perspective of a completed shoulder strap assembly.

DESCRIPTION OF THE PREFERRED EMBODIMENT

Referring to FIGURES 1 through 8 a base 40 has a platform 41 slideably mounted thereon for movement between a normal position (illustrated in full lines in FIG. 1) and a transfer position (illustrated in dotted lines in FIG. 1). The base 40 has two pairs of upstanding guides 42 fixedly mounted thereon with two horizontally extending rods 43 affixed therein each having two bearing blocks 44 slideably engaged thereon and fixedly attached to the under surface of the platform 41. The platform 41 is moved horizontally between the normal position and the transfer position by means of a pneumatic cylinder 45 the piston of which is connected to the platform 41 by a rod 46. The pneumatic cylinder 45 is automatically operated in a predetermined sequence between the normal position and the transfer position by means of some timing device, not shown, such as mechanical cams or electronic circuitry.

A threading station generally designated 50 is located adjacent the leading edge of the platform 41 and has a rearwardly extending track 51 in communication therewith (see FIG. 5). The rearmost end of the track 51 communicates with the lower end of an upwardly extending magazine 52 adapted to receive a plurality of buckles 53 therein. Each of the buckles 53 is generally rectangular in shape and has a pair of openings 54 and 54a therethrough with the central portion of the buckle 53 between the openings 54 and 54a being designated 55. The buckles 53 in the magazine 52 are fed into the track 51 by some convenient means, such as gravity or an internal spring, and the lower end of the magazine 52 is spaced from the buckle receiving surface of the track 51 approximately the thickness of a buckle 53.

A flat blade 56 is positioned at the rearmost end of the track 51 and is formed so as to be readily insertable into the track 51. The piston of a pneumatic cylinder 57 is connected to one end of the blade 56 by a rod 58 and upon the actuation of the pneumatic cylinder 57 the blade 56 is pushed into the track 51 and the lowermost buckle 53 in the magazine 52 is moved thereby to the threading station 50, as illustrated in FIG. 18, whereupon the blade 56 returns to the normal position (illustrated in FIG. 5). The pneumatic cylinder 57 is actuated in a predetermined sequence, which will become apparent presently.

A track generally designated 60 is formed in the leading edge of the platform 41 and extends from the lower edge thereof (as viewed in FIG. 1) slightly beyond the threading station 50. The track 60 is adapted to slideably receive therein strap material 61 from a source (not shown). The strap material 61, in this embodiment, is an elongated piece of cloth having the longitudinal edges each folded inwardly a plurality of times and sewn adjacent the longitudinal axis thereof. The width of the strap material 61 may vary according to the type of ladies' garment to which it will be attached and it should be understood that the buckle 53 as well as certain critical portions of the described apparatus will vary therewith.

A portion of the track 60 adjacent the lower edge (in FIG. 1) of the platform 41 has an upwardly opening slot therein and a finger 62 is positioned therein so as to bear against the upper surface of the strap material 61 and frictionally engage the same for longitudinal movements along the track 60 (see FIGS. 1 and 6). The finger 62 is angled generally in the direction of movement of the strap material 61 (toward the threading station 50) and is spring biased downwardly by a leaf spring 63 to insure positive frictional engagement of the finger 62 with the strap material 61. The finger 62 is attached to the piston of a pneumatic cylinder 64 by a rod 65, which pneumatic cylinder 64 is operated in a predetermined sequence. As the pneumatic cylinder 64 is operated the finger 62 moves the strap material 61 longitudinally down the track 60 until the free end thereof extends slightly beyond the threading station 50 and below a buckle 53 positioned therein (see FIG. 19). The pneumatic cylinder 64 and finger 62 remain in the extended position until the strap material 61 is fixedly engaged in the buckle 53, which engagement will be described presently.

An up-tucker generally designated 68 is affixed to the under side of the platform 41 adjacent the threading station 50. The up-tucker 68 includes a pair of vertical, spaced apart guide rods 69 extending downwardly from the under surface of the platform 41 and having a block 70 slidably engaged thereon for vertical movements. The block 70 is positioned so that one edge thereof is directly below the threading station 50 and an upwardly extending blade 71 is affixed thereto, so that upward movement of the block 70 moves the upper end of the blade 71 upwardly through the threading station 50 and through the openings 54 in a buckle 53 positioned therein. The buckle 53 is positioned in the threading station 50 with the opening 54 adjacent the side from which the strap material 61 is fed and the opening 54a opposite thereto. The block 70 is attached to the piston of a pneumatic cylinder 72 by a rod 73 for movement therewith in a predetermined sequence. The up-tucker 68 pushes the free end of the strap material 61 upwardly through the opening 54 of the buckle 53 furthest from the free end thereof and, because the strap material 61 is positioned generally parallel with the buckle 53, the free end of the strap material 61 extending through the opening 54 of the buckle 53 lies generally over the second opening 54a in the buckle 53, as illustrated in FIG. 20.

A down-trucker generally designated 76 is affixed to the upper surface of the patform 41 generally above the up-tucker 68. The down-tucker 76 is similar to the up-tucker 68 and includes a pair of guide rods 77 extending vertically upwardly in a spaced apart relationship from the upper surface of the platform 41 and having a block 78 slideably engaged thereon for vertical movements. The block 78 has a blade 79 affixed to an edge thereof so as to pass downwardly through the opening 54a in the buckle 53 positioned in the threading station 50 when the block 78 moves downwardly. The block 78 is attached to the piston of a pneumatic cylinder 80 by a rod 81 for movements in a predetermined sequence therewith. After the up-tucker 68 pushes the free end of the strap material 61 through the opening 54 of the buckle 53 the down-tucker 76 pushes the free end through the opening 54a of the buckle 53 (see FIG. 20).

A blade 75 is mounted beneath the end of the track 60 and generally parallel therewith for longitudinal movements beneath the threading station 50. The blade 75 is affixed to the piston of a pneumatic cylinder 82 by a rod 83 for movements in a predetermined sequence therewith. Once the free end of the strap material 67 is pushed downwardly through the opening 54a of the buckle 53 in the threading station 50 (see FIG. 20) the pneumatic cylinder 82 is actuated and the blade 75 moves under the threading station 50 and folds the free end of the strap material 61 back on the main body thereof (see FIG. 21). In addition to folding the free end of the strap material 61 beneath the main body thereof the blade 75 hold the strap material 61 engaged in the buckle 53 until the release thereof, which will be explained presently. With the strap material 61 held in place by the blade 75, the finger 62 may be retracted in preparation for the next sequence.

A central portion of the track 60 is formed so it extends through a block 84 slideably mounted on a vertical track 85 for vertical movements therealong. The track 85 is fixedly attached to the base 40 and extend downwardly from adjacent the underside of the platform 41 a distance sufficient to allow variable movements of the block 84. The block 84 is attached to the piston of a pneumatic cylinder 86 by an elongated rod 87. The pneumatic cylinder 86 normally maintains the block 84 so that the portion of the track 60 therethrough is in alignment with the remainder of the track 60. Upon actuation of the pneumatic cylinder 86 the block 84 moves downwardly along the track 85 pulling additional strap material 61 from the source thereof (see FIG. 21). Rod 87 is threadedly engaged, at its upper end, in an aperture in a lower surface of the block 84 and the position of the block 84 relative to the track 60 can be adjusted somewhat by adjusting the position longitudinally of the rod 87 in the block 84. Adjustments of the vertical distance the block 84 moves are made by replaceable stop elements 89 detachably mounted adjacent the lower end of the track 85 in the path of travel of the block 84. With the free end of the strap material 61 threaded through a buckle 53 and held in place by the blade 75 the pneumatic cylinder 86 is actuated causing the block 84 to move downwardly and measure a predetermined amount of strap material 61.

A knife blade 90 is slideably engaged in a vertical track 91, extending upwardly from the upper surface of the platform 41, so as to intersect the track 60 (see FIGS. 5 and 6). Mating surfaces 92 are provided beneath the track 60 and cooperate with the knife blade 90 to provide scissor-like action for severing the strap material 61. The knife blade 90 is attached to the piston of a pneumatic cylinder 93 by a rod 94. When the pneumatic cylinder 86 moves the block 84 into its lowermost position to measure the desired length of strap material 61, the pneumatic cylinder 93 is actuated to cause the knife blade 90 to move downwardly and sever the measured portion of strap material from the main body thereof. A pneumatic jet 95 is attached to a valve 96 and positioned above the normal position of the block 84 so as to cause the severed end of the measured length of strap material 61 to fall downwardly from the block 84 after the knife blade 90 has severed the same (see FIG. 21). The necessity of this action will become apparent presently.

A pneumatic rotary motor 100 is attached to the under surface of the base 40 with the rotary shaft thereof perpendicular to the track 85 and adjacent the lower end thereof. The motor 100 has an L-shaped arm 101 fixedly attached thereto so that the first portion extends radially outwardly from the rotary shaft and the second portion extends away from the motor 100 generally parallel with the shaft. The motor 100 and the arm 101 are positioned so that the second portion of the arm 101 travels in an arc about the block 84 when the block 84 is in its lowermost position. As seen especially in FIG. 21, once the strap material is severed and the jet 95 blows the severed end into the downwardly hanging position from the block 84, the arm 101 rotates clockwise (in this embodiment through approximately 250°) around and above the block 84 to wipe the strap material from the portion of the track 60 passing therethrough. Thus, the severed end of the strap material 61 hangs downwardly from the track 60 between the block 84 and the threading station 50. The motor 100 rotates the arm 101 back through the arc upon completion of the clockwise movement so that the severed end of the strap material 61 is moved to the other side of the block 84 and it is ready for further operations.

The block 84 has an arm 102 attached thereto which extends along the outer edge of the track 60 past the threading station 50 and forms the outer wall of the track 60 and the threading station 50 when the block 84 is in its upper or normal position (see FIGS. 1, 3 and 18). When the block 84 moves to its lower position, the arm 102 is removed from the track 60 and the threading station 50 so that the severed portion of the strap material 61 and the buckle 53 threaded thereon are free to move horizontally outwardly therefrom. The block 84 and its attached arm 102 remain in the lower position until a later time, which will be explained presently.

A sewing machine 104 is attached to the base 40 in a position spaced outwardly from the threading station 50 generally away from the opening provided in the threading station 50 when the arm 102 is moved downwardly. The sewing machine 104 has an outwardly extending sewing arm 103 with a buckle receiving platform or pressure foot 105 pivotally attached thereto by means of a bolt 106 for pivotal movement in a generally horizontal direction about the bolt 106 (see FIGS. 1, 2 and 7). The pressure foot 105 is connected to the piston of a pneumatic cylinder 107 by a rod 108 for limited pivotal movement about the bolt 106. A sewing station 109 in one edge of the pressure foot 105 is normally positioned so that the edges thereof are parallel with but spaced from the edges of the threading station 50 (see FIG. 22). Upon energization of the pneumatic cylinder 45 and movement of the platform 41 on the rods 43, the threading station 50 moves into juxtaposition with the sewing station 109 so that the threaded buckle 53 is easily transferred therebetween (see FIG. 7). A pressure foot position adjustment 110 consists of a bolt threadedly engaged through an opening fixedly attached to the arm of the sewing machine 104 so that the end of the bolt acts as a stop to prevent further clockwise rotation of the pressure foot 105 (see FIG. 7). The pneumatic cylinder 107 retains the pressure foot 105 tightly abutting the pressure foot position adjustment 110 to insure that the sewing station 109 is correctly positioned relative to the threading station 50. It should be understood that the sewing machine 104 is simply one example of a fastening means and many other devices for fastening the strap material around the buckle 53 might be devised by those skilled in the art, all of which come within the scope of this invention if they perform the functions thereof.

Referring to FIGURE 7, a horizontally positioned L-shaped blade 113 is slidably engaged in a slot in the platform 41, which slot is adjacent and in communication with the track 60, so that an edge of the blade 113 is normally adjacent and parallel with the track 60. The blade 113 is connected to the piston of a pneumatic cylinder 114 by a rod 115 for horizontal movements therewith generally perpendicular to the longitudinal axis of the track 60. In the normal sequence of operation the platform 41 is moved into the transfer position by energization of the pneumatic cylinder 45 after which pneumatic cylinder 82 is energized removing the blade 75 which holds the free end of the strap material 61 tucked under the main body thereof below the buckle 53 in the threading station 50. The pneumatic cylinder 114 is then energized moving the blade 113 horizontally into the track 60 and forcing the strap material 61 and buckle 53 from the track 60 and threading station 50 (see FIG. 22). The buckle 53 moves from the threading station 50 into the sewing station 109 while the strap material 61, forced from the track 60, hangs downwardly over the arm of the sewing machine 104, as illustrated in FIGURE 8. Upon transfer of the buckle 53 from the threading station 50 the platform 41 returns to the normal position. The pneumatic cylinder 64 is then energized and new strap material 61 is moved into the track 60 while a new buckle 53 is moved into the threading station 50 by energization of the pneumatic cylinder 57.

The portion of the pressure foot 105 adjacent the sewing station 109 and adjacent the platform 41 during the transfer of the buckle 53 is spaced vertically upwardly from the sewing arm 103 of the sewing machine 104 so as to form a horizontal slot therebetween (see FIG. 8). An under-tucking blade 118 is slideably engaged in the slot between the sewing arm 103 and the pressure foot 105 for horizontal movement into and away from a position underlying the sewing station 109. The blade 118 has an opening 119 therethrough which is positioned in underlying relationship beneath the opening 54 in the buckle 53. The blade 118 is fixedly attached to a vertically upwardly projecting member 120, which extends upwardly through a slot 121 in the pressure foot 105. The member 120 is attached to the piston of a pneumatic cylinder 122 by a rod and attaching mechanism 123. The slot 121 is formed to limit the horizontal movement of the blade 118 and member 120 so that the blade 118 is moved out of the underlying position during the transfer of the buckle 53 to the sewing station 109 and is moved into the underlying position to tuck the free end of the strap material 61 under the main body thereof during the sewing operation. A switch 124 is mounted to be engaged by the attaching mechanism 123 when the opening 119 of the blade 118 is aligned beneath the opening 54 of the buckle 53 in the sewing station 109. The switch 124 is connected by circuitry (not shown) to the energization source of the sewing machine 104 to either cause the sewing machine 104 to be energized upon the closure thereof or to act as a safety device to prevent the energization of sewing machine 104 prior to the closure thereof. Energizing the pneumatic cylinder 122 causes the blade 118 to tuck the free end of the strap material 61 beneath the main body thereof and hold it fixedly in position, whereupon the sewing machine 104 is energized and the free end of the strap material 61 is tacked to the main body thereof so as to encircle the central portion 55 of the buckle 53.

After the sewing operation is completed the pneumatic cylinder 107 is energized and the pressure foot 105 is rotated 90° about the bolt 106 (from the position illustrated in FIG. 22 to the position illustrated in FIG. 25). The amount of rotation of the pressure foot 105 is limited by the movement produced by the pneumatic cylinder 107 and, in this embodiment, when the piston of the pneumatic cylinder 107 is extended its maximum distance the pressure foot 105 is in the correct rotated position. Upon completing rotation of the pressure foot 105 the pneumatic cylinder 122 is operated to remove the blade 118 from its underlying position beneath the sewing station 109 and the buckle 53 with the strap material 61 fixedly attached thereto is available for transfer to the next position.

Upon 90° rotation of the pressure foot 105 from its normal position the sewing station 109 is substantially aligned with one end of an elongated track 125 (see FIG. 25). The track 125 is adapted to receive a buckle 53 in sliding engagement therein for longitudinal movement therealong. The track 125 is formed from two substantially similar members positioned in spaced apart relationship with grooves in their adjacent surfaces adapted to receive edges of the buckles therein to allow longitudinal sliding movement and substantially prevent vertical movement thereof. The two portions of the track 125 are spaced apart so that a buckle 53 therebetween is easily accessible from above and so that the attached strap material 61 depends therebelow.

An elongated pneumatic cylinder 126 is positioned above the track 125 substantially parallel thereto and contains a piston (not shown) adapted to move the length thereof. One side of the piston has a flexible cable 127 attached thereto, which flexible cable 127 extends around a pulley 128, affixed to the end of the pneumatic cylinder 126 adjacent the pressure foot 105, and is affixed to a sliding block 129. The sliding block 129 is engaged over the track 125 so as to slide freely the length thereof. The other side of the piston within the pneumatic cylinder 126 has a second flexible cable 130 attached thereto which extends over a pulley 131 affixed at the opposite end of the pneumatic cylinder 126 and the flexible cable 130 is also attached to the sliding block 129. Thus, movement of the piston within the cylinder 126 in either direction causes movement of the sliding block 129 in the opposite direction along the track 125 (see FIGS. 1, 4, 9 and 11).

The end of the sliding block 129 closest to the pressure foot 105 has a finger 134 pivotally attached thereto so as to extend outwardly from the sliding block 129 generally in the direction of the track 125. Referring to FIGURE 11, the finger 134 is biased downwardly into the opening between the portions of the track 125 by gravity and the outermost portion 135 of the finger 134 is curved upwardly so as to cam the finger 134 upwardly whenever the portion 135 strikes buckle 53 in the track 125 during movements of the sliding block 129 toward the pressure foot 105. The finger 134 has a hook-shaped portion 136 in the lowermost edge thereof so that movement of the sliding block 129 in the opposite direction will cause the finger 134 to engage and slide buckles 53 longitudinally along the track 125 as the sliding block 129 moves along the track. After energization of the pneumatic cylinder 107 and 90° rotation of the pressure foot 105 the pneumatic cylinder 126 is operated to move the sliding block 129 along the track 125 until the hook-shaped portion 136 of the finger 134 engages the opening 54a in the buckle 53 positioned in the sewing station 109 (see FIG. 25). The pressure on the pneumatic cylinder 126 is then reversed so that the sliding block 129 reverses direction and moves the buckle 53 from the sewing station 109 along the track 125 to an intermediate position (such as illustrated in FIG. 11). Because of the cam-shaped portion 135 movement of the sliding block 129 toward the sewing station 109 will cause the finger 134 to become disengaged from the buckle 53 and the finger 134 will be ready to engage another buckle 53.

A first buckle 53 is moved to an intermediate position, as illustrated in FIGURE 11, by the finger 134 after which the pressure on the pneumatic cylinder 126 is reversed so that the direction of movement of the sliding block 129 is reversed. With movement of the sliding block 129 reversed the finger 134 is cammed upwardly by engagement of the cam-shaped outermost portion 135 on the buckle 53 and the buckle 53 remains in the intermediate position while the sliding block 129 returns to a position adjacent the pressure foot 105. As the sliding block 129 reaches a position at the extremity of its movement the direction of movement is reversed, the finger 134 engages a second buckle 53 in the sewing station 109 and the block 129 begins traveling toward the other end of the track 125. The side of the sliding block 129 opposite the side having the finger 134 mounted thereon has an outwardly extending finger 139 pivotally attached thereto for vertical movements generally in the plane of the track 125. The finger 139 is gravity-biased downwardly with the extreme end thereof normally positioned between the portions of the track 125. The outer most extremity of the finger 139 is formed into a downwardly extending point with an outermost or forward edge 140 extending substantially vertically and a rearward edge forming a cam surface 141. Thus, when the forward edge 140 of the finger 139 engages a buckle 53 in the track 125, with the sliding block 129 traveling away from the pressure foot 105, the buckle 53 is moved longitudinally along the track 125 in front of the finger 139. When the cam surface 141 of the finger 139 engages a buckle 53 in the track 125, with the sliding block 129 traveling toward the pressure foot 105, the cam surface 141 raises the finger 139 vertically so that the buckle 53 is not moved in the track 125. As the sliding block 129 moves longitudinally along the track 125 from the pressure foot 105 with the second buckle 53 engaged with the finger 134, the forward edge 140 of the finger 139 engages the first buckle 53 at the intermediate position and moves it longitudinally therewith. When the sliding block 129 moves into its extreme position at the end of the track 125 the finger 139 urges the buckle 53 into a transfer station 142 (see FIG. 26).

The transfer station 142 is formed by the junction of the track 125 with a track 143, which extends away from the end of the track 125 approximately perpendicular thereto. A trap 144 is slideably engaged in a slot in the track 143 for movement across the end of the track 143 to form an extension of one side of the track 125 and guide the buckle 53 into the transfer station 142. As illustrated specifically in FIGURES 14 and 26, the trap 144 extends across the longitudinal buckle receiving opening of the track 143 to allow buckles 53 to be moved down the track 125 to the extreme end thereof, which is the opposite side of the track 143. The trap 144 is connected to the piston of a pneumatic cylinder 145 by a rod 146. The pneumatic cylinder 145 is actuated prior to the movement of a buckle 53 into the transfer station 142 by the finger 139 on the sliding block 129. Once a buckle 53 is properly postioned in the transfer station 142 the trap 144 can be withdrawn to allow movement of the buckle 53 longitudinally along the track 143.

The track 143 is constructed in a fashion similar to the track 125 with two opposed spaced apart portions having grooves 138 in adjacent sides thereof adapted to receive a buckle 53 slideably therein. The space between the two portions of the track 143 opens downwardly to allow the passage of the depending strap material 61 and upwardly for the insertion of a finger 148 to engage buckles 53 in the transfer station 142 and move them longitudinally along grooves 138 of the track 143. The finger 148 is fixedly attached in the end of a shaft 149 in a generally vertically downwardly extending postion. The shaft 149 has a generally rectangularly shaped cross-section and is slideably engaged in a similarly shaped track 150 for longitudinal telescoping action therebetween (see FIGS. 9, 10 and 13). The track 150 and shaft 149 are postioned so that the finger 148 is directly above the transfer station 142 with the shaft 149 and track 150 telescoped together and extending generally perpendicular to the track 125 in a direction opposite to the direction of the track 143. The end of the track 150 furthest removed from the transfer station 142 is pivotally attached to a small platform 151, which is in turn fixedly attached to the track 143 and generally parallel thereto, for vertical movement of the opposite end thereof, the shaft 149 and the finger 148. The shaft 149 is connected to the piston of a pneumatic cylinder 152 by means of a block and rod 153. The pneumatic cylinder 152 is mounted on the track 150 and extends outwardly from the pivotally mounted end thereof in a direction opposite to the shaft 149.

A second pneumatic cylinder 154 is mounted vertically above the track 150 at approximately the longitudinal mid-section thereof with a rod 155, which is attached to the piston, extending downwardly and butting against the upper surface of the track 150. A coil tension spring 147 attached between the cylinder 154 and the track 150 biases the track 150, shaft 149 and finger 148 vertically upwardly. Thus, energization of the pneumatic cylinder 154 causes the track 150 and, consequently, the finger 148 to move vertically downwardly, while energization of the pneumatic cylinder 152 causes the shaft 149 and track 150 to extend longitudinally and move the finger 148 along the track 143. Once a buckle 53 is moved into the transfer station 142 and the trap 144 is withdrawn, the pneumatic cylinder 154 is energized to engage the finger 148 in the opening 54a of the buckle 53 and the pneumatic cylinder 152 is energized to move the buckle 53 in groove 138 along the track 143 to a threading station 158 located at an intermediate position along the track 143 (see FIG. 27).

A trap 159 (see FIG. 14) having a pair of generally parallel spaced apart arms positioned perpendicularly to the longitudinal axis of the track 143, is slideably engaged in slots in the side of the track 143 so that the two arms can be inserted into the track 143 on either side of a buckle 53 to prevent movement thereof. The trap 159 is attached to the piston of a pneumatic cylinder 160 by a rod 161. When the finger 148 moves a buckle 53 into the threading station 158 the pneumatic cylinder 160 is energized to insert the trap 159 into the track 143 and prevent further movement of the buckle 53 along grooves 138 (see FIGS. 27, 28 and 29).

As buckles 53 move in the grooves of tracks 125 and 143 the strap material affixed thereto depends vertically downwardly between the portions of track. Prior to movement of a buckle 53 from the transfer station 142 to the threading station 158 a pin 163, which is positioned generally horizontal and perpendicular to the longitudinal axis of the track 143 (see FIGS. 13 and 14), is moved in underlying position beneath the grooves 138 by energization of a pneumatic cylinder 164 attached thereto. The pin 163 obstructs the movement of the downwardly depending strap material attached to buckles 53 moving in the grooves 138 and causes a portion of the strap material to extend rearwardly from the buckle 53 around the pine 163. An elongated blade 165 is slideably engaged in a groove 166 parallel with and underlying the groove 138 of track 143 (see FIGS. 13 and 27). The groove 166 is positioned slightly below the pin 163 so that movement of the blade 165 therein engages the downwardly hanging strap material and moves the free end toward the underside of the threading station 158. The pin 163 is spaced from the threading station 158 longitudinally along the track 143 a sufficient distance so that the free end of strap material attached to a buckle 53 in the threading station 158 is moved by the blade 165 into underlying relationship beneath the threading station 158 (as illustrated in FIG. 27). The longitudinal position of the pin 163 is adjustable along the track 143 to compensate for various lengths of strap material. The blade 165 is attached to the piston of a pneumatic cylinder 167 by a rod 168 (see FIG. 10). The blade 165 has an opening 169 therethrough which is positioned to underlie the threading station 158 when the blade 165 has moved to its extreme longitudinal position, illustrated in FIG. 27, and the free end of the strap material is correctly positioned.

The track 143 extends longitudinally beyond the threading station 158 but the grooves 138 terminate a short distance beyond the threading station 158 so as to release buckle 53 prior to the end of the track 143, for reasons which will become apparent hereinafter. A pair of grooves 170, formed in opposed faces of track 143 between grooves 138 and 166, are positioned parallel with the grooves 138 and extend from the threading station 158 to the end of the track 143. The grooves 170 are adapted to have rings 174 slideably engaged therein for longitudinal movements therealong, as will be described in detail hereinafter.

A track 171, attached to the track 143 so as to extend approximately perpendicularly outwardly therefrom at the threading station 158, includes grooves 172 which communicate with grooves 170 through a slot in the side portion of the track 143 (see FIGS. 9, 12 and 14). The rearmost ends of the grooves 172 communicate with the lower end of an upwardly extending magazine 173 adapted to receive a plurality of rings 174 therein. The rings 174 in the magazine 173 are fed into the grooves 172 by some convenient means, such as gravity or an internal spring, and the lower end of the magazine 173 is spaced from the ring receiving surface of the grooves 172 approximately the thickness of a ring 174. A flat blade 175 is positioned at the rearmost end of the track 171 and is formed so as to be readily insertable into the grooves 172. The piston of a pneumatic cylinder 176 is connected to one end of the blade 175 by a rod 177 and upon the actuation of the pneumatic cylinder 176 the blade 175 is pushed into the grooves 172 and the lowermost ring 174 in the magazine 173 is moved thereby into the grooves 170 at the threading station 158, whereupon the blade 175 returns to the normal position (illustrated in FIG. 12).

A trap 180, similar in construction to the trap 159, is sildeably engaged with slots in the side of the track 143 for transverse movement thereacross grooves 170 into longitudinal alignment with the grooves 172. The trap 180 is connected to the piston of a pneumatic cylinder 181 by a rod 182. Prior to the actuation of the pneumatic cylinder 176 the pneumatic cylinder 181 is actuated to align the trap 180 with the grooves 172. Upon actuation of the pneumatic cylinder 176 a ring 174 is removed from the magazine 175 and moved into the trap 180 below the trap 159. The positioning of the traps 159 and 180 is such that the ring underlies the opening 54a in the buckle 53 but does not underlie the opening 54 (see FIGS. 27 and 28). The track 143 is fixedly attached to a platform 185 and base 40 so that the track 143 and associated apparatus previously described are approximately at the level of the upper surface of the platform 185. The platform 185 is fixedly attached to the base 40 and spaced thereabove approximately the distance between the platform 41, previously described, and the base 40.

An up-tucker generally designated 186 (see FIG. 10) is affixed to the base 40 below the threading station 158 and includes a blade 187 aligned vertically below the ring 174 and the opening 54a in the buckle 53 which is overlying the ring 174 (see FIG. 27). The blade 187 is attached to the piston of a pneumatic cylinder 188 by a rod 189 for vertical movement upwardly through the ring 174 and the opening 54a of the buckle 53. Movement of the blade 187 upwardly forces the free end of the strap material affixed to the buckle 53 through the opening in the ring 174 and the opening 54a in the buckle 53. A pneumatic valve 191 is affixed to the base of a down-tucker generally designated 192 above the threading station 158 (see FIG. 10). The valve 191 has a jet 190 operatively attached thereto and directed toward the threading station 158 so that the free end of the strap material is moved into overlying relationship above the opening 54 in the buckle 53 after the up-tucker 186 is operated (see FIG. 28).

Prior to actuation of the down-tucker 192, the pneumatic cylinder 164 is operated to withdraw the pin 163 from the strap material to allow the free movement thereof downwardly. An elongated foot 195 is attached to the piston of a pneumatic cylinder 196 by a rod 197 directly above the central opening of the track 143 between the trap 159 and the pin 163. The foot 195 is aligned vertically above the opening between the portions of the track 143 so that actuation of the pneumatic cylinder 196 moves the foot 195 downwardly between the two portions of the track 143 and forces the strap material out of the track 143 to insure the movement of the strap material into a downwardly hanging position beneath the threading station 158 (as illustrated in FIG. 28).

The down-tucker 192 includes a blade 198 positioned vertically above the threading station 158 so as to be aligned with the opening 54 in a buckle 53 positioned therein. The blade 198 is attached to the piston of a pneumatic cylinder 199 by a rod 200. After actuation of the pneumatic cylinder 196 to move the foot 195 and position the strap material below the threading station 158 and actuation of the pneumatic valve 191 to move the free end of the strap material over the opening 54 in the buckle 53 (see FIG. 28), the pneumatic cylinder 199 is actuated to move the blade 198 downwardly through the opening 54 and thread the free end of the strap material therethrough (see FIG. 29).

An elongated shaft 203 (see FIG. 10) having a generally rectangular shaped cross-section is slideably engaged in a similarly shaped track 204 for telescoping action therebetween. The track 204 is fixedly attached to a platform 205, which is in turn fixedly attached below the base 40, so that the shaft 203 and track 204 are positioned generally below the track 143 and angle upwardly from generally beneath the transfer station 142 toward the threading station 158. The length and position of the shaft 203 and track 204 are such that in the extended position the outermost end of shaft 203 is adjacent the underside of the threading station 158. A generally upwardly extending jaw 206 is fixedly attached to the end of the shaft 203 for movement therewith (see FIGS. 10 and 29). A mating jaw 207 is slideably mounted on the upper surface of shaft 203 so as to normally form a vertically upwardly opening mouth between the jaws 206 and 207. The jaw 207 is attached to the piston of a pneumatic cylinder 208 so that upon actuation thereof the jaw 207 slides into strap gripping engagement with the jaw 206. The shaft 203 is connected to the piston of a pneumatic cylinder 209 by a rod 210 while the pneumatic cylinder 209 is affixed to the track 204 so that actuation thereof produces extending and telescoping movements between the shaft 203 and the track 204. With the shaft 203 fully extended the upwardly opening mouth formed between jaws 206 and 207 is positioned directly below the threading station 158 so that the free end of the strap material pushed through the opening 54 by the blade 198 of the down-tucker 192 is positioned therein (full line position of FIG. 29). Upon retraction of the blade 198 by reversal of pressure on the pneumatic cylinder 199 the pneumatic cylinder 208 is energized closing the jaws 206 and 207 on the free end of the strap material (dotted position FIG. 29). With the jaws 206 and 207 gripping the free end of the strap material the pneumatic cylinder 209 is energized to telescope the shaft 203 and track 204 together (full line position of FIG. 10). The length and position of the shaft 203 and track 204 as well as the position of the pneumatic cylinder 209 are such that the strap material is pulled through the buckle and ring a distance such that a shoulder strap having an approximately average length (as illustrated in FIG. 36) is formed. Various parts of the apparatus, such as shaft 203, track 204, pneumatic cylinder 209, etc., may have adjustments associated therewith for varying the length or position thereof to vary the amount the strap material is pulled through the buckle and ring. In this embodiment a replaceable stop block 211 is positioned in the lower end of the track 204 in the path of travel of the shaft 203 to limit the telescoping movements thereof. To adjust the length to which the strap material is pulled the stop block 211 is simply replaced with a longer or shorter stop block. After the strap material is pulled the desired distance pressure on the pneumatic cylinder 208 is reversed to move the jaw 207 and release the free end of the strap material.

An elongated downwardly extending finger 213 (see FIGS. 10 and 13) is fixedly attached to the end of a shaft 214 which is in turn slideably engaged in a mating track 215 for extending and telescoping movements therebetween. The track 215 is pivotally mounted adjacent the track 143 so that the finger 213 is positioned above the ring 174 in the threading station 158 but not above the buckle 53 positioned therein. The shaft 214 is connected to the piston of a pneumatic cylinder 216 by a rod 217 for extending and telescoping movements. The pneumatic cylinder 216 is positioned to the rear of the point at which the track 215 is pivotally mounted and is fixedly attached thereto so the rod 217 moves parallel with the longitudinal axis of the track 215. A pneumatic cylinder 218 is mounted above the track 215 with a rod 219 extending downwardly into abutting engagement with the upper surface of the track 215. A coil tension spring 212 is connected between the track 215 and the pneumatic cylinder 218 and acts to bias the track 215, shaft 214 and finger 213 upwardly. Energization of the pneumatic cylinder 218 causes the rod 219 to move the track 215 pivotally downwardly so that the finger 213 engages the ring 174 positioned in the threading station 158 (see FIG. 29). Energization of the pneumatic cylinder 216 causes the shaft 214 to extend longitudinally outwardly relative to the track 215 and move the ring 174 along the grooves 170 to a second threading station generally designated 220. As the ring 174 is moved into the threading station 220 the buckle 53 associated therewith reaches the terminal end of grooves 138 and is removed from engagement therewith (see FIG. 30). The threading station 220 is located adjacent the extreme end of the grooves 170 and a spring finger 221 is positioned adjacent thereto to bear upon the upper surface of the ring 174 and prevent disengagement thereof from the grooves 170.

A track 224 is positioned on the upper surface of the platform 185 (see FIGS. 9 and 10) and extends from the outer edge thereof inwardly toward the threading station 220 at an angle of approximately 15° to the longitudinal axis of the grooves 170. The track 224 has a strap material 225 slideably engaged therein for movement along the longitudinal axis. The strap material 225 is supplied from a source of strap material not shown. A longitudinally extending shaft 226 having a downwardly extending finger 227 at the end thereof is slideably engaged in a similarly shaped track 228 for extending and telescoping movements therebetween. The shaft 226 and track 228 are pivotally mounted in overlying relationship to the track 224 at the end of the track 228 furthest from the threading station 220 for vertical movement of the finger 227. The shaft 226 is connected to the piston of a pneumatic cylinder 229 for longitudinal telescoping and extending movements within the track 228. The pneumatic cylinder 229 is mounted outwardly from the pivotal point of the track 228 and is fixedly attached thereto so the piston rod thereof moves parallel to the longitudinal axis of the track 228. A pneumatic cylinder 230 is mounted vertically above the track 228 with a rod 231 attached to the piston thereof and butting against the upper surface of the track 228. A coil tension spring 223 is connected between the track 228 and the pneumatic cylinder 230 to bias the track 228, shaft 226 and finger 227 upwardly. Thus, energization of the pneumatic cylinder 230 forces the track 228 and shaft 226 downwardly until the finger 227 engages the strap material 225 in the track 224. The pneumatic cylinder 229 is then energized to cause extending motion of the shaft 226 relative to the track 228 and consequent longitudinal movement of the strap material 225 in the track 224. An adjustable stop 232 (see FIG. 9) is affixed to the upper surface of the track 224 to limit the movement of the shaft 226 and, consequently, the movement of the strap material 225 in the track 224. Through adjustment of the stop 232 and the various components described the strap material 225 is moved until the free end thereof underlies the threading station 220 and the ring 174 positioned therein (see FIGS. 30 and 31).

An up-tucker generally designated 235 (see FIGS. 10, 15 and 17) is fixedly attached to the under surface of the platform 185 directly below the threading station 220. The up-tucker 235 includes a blade 236 attached to the piston of a pneumatic cylinder 237 so that actuation of the pneumatic cylinder 237 causes upward movement of the blade 236 which, consequently, pushes the free end of the strap material 225 upwardly through the ring 174 in the threading station 220 (see FIGS. 15 and 30). Fork forming means generally designated 240 (see FIGS. 9 and 15) are slideably mounted on the upper surface of the platform 185 with the longitudinal axis thereof lying at an angle of approximately 15° to the longitudinal axis of the track 143 and approximately 30° to the longitudinal axis of the track 224 containing the strap material 225. The fork-forming means 240 is adapted to receive the free end of the strap material as it is pushed upwardly through the ring 174 in the threading station 220 and to form a fork therefrom in the following manner.

Referring to FIGURES 9, 15 and 16, it can be seen that the fork-forming means 240 includes a pneumatic cylinder 241 pivotally attached to the underside of the platform 185 with an elongated shaft 242 fixedly connected to the piston thereof by a rod 243 so as to extend upwardly through an elongated opening 244 in the platform 185. The shaft 242 has a spring 245 attached thereto with the other end attached to the base 40 (see FIG. 10) to bias the pneumatic cylinder 241 toward the horizontal position. A pneumatic cylinder 248 is fixedly attached to the upper end of the shaft 242 above the platform 185 for pivotal movements therewith. Both the pneumatic cylinders 241 and 248 are mounted with the longitudinal axes thereof generally along the axis making an angle of 15° with the track 143 and 30° with the track 224, as previously described. The piston of the pneumatic cylinder 248 has attached thereto a cylindrical member 249 with the longitudinal axis thereof approximately parallel with the pneumatic cylinder 248. The outermost end of the cylindrical member 249 is fixedly attached (in this embodiment an integral portion of) to an elongated block 250. The block 250 is attached to the cylindrical member 249 so that it is positioned slideably within a channel formed in the upper surface of the platform 185 when the pneumatic cylinders 248 and 241 are in the horizontal position. The cylindrical member 249 and block 250 are further positioned so that they extend toward the threading station 220.

The end of the block 250 closest to the threading station 220 has a jaw 251 fixedly attached thereto with a guide 252 extending generally outwardly perpendicular thereto. A second jaw 253 has an elongated body 254 which extends the length of the block 250 and has a ring-shaped member 255 attached to the other end thereof. The ring-shaped member 255 is slideably engaged coaxially over the cylindrical member 249 for sliding movements therealong while the jaw 253 cooperates with the jaw 251 to form a laterally outwardly and downwardly opening mouth. The jaw 253 has an opening 256 therein with the guide 252 extending therethrough to insure that material gripped by the jaws 251 and 253 is always gripped at approximately the same angle.

The block 250 has an upwardly projecting portion 259 adjacent the cylindrical member 249 with a pneumatic cylinder 260 fixedly attached thereto and extending in overlying relationship to the block 250. The piston of the pneumatic cylinder 260 is attached to a downwardly extending finger 261 by a rod 262 extending from the pneumatic cylinder 260 in overlying relationship to the cylindrical member 249. The finger 261 is positioned so as to engage the ring 255 and slide it rearwardly along the cylindrical member 249. Rearward movement of the ring 255 causes sliding movements of the body 254 along the block 250 and closing of the jaws 211 and 253. The finger 261 has an adjustment screw 263 attached thereto so that the distance the jaw 253 moves relative to the jaw 251 can be adjusted. The opening of the jaws 251 and 253 can be performed by spring biasing means or the finger 261 can be fixedly attached to the ring-shaped member 255, as in the present embodiment. A pair of plates 264 are mounted on either side of the opening 244 adjacent the block 250 and the shaft 242 to guide the movements thereof.

The pneumatic cylinder 241 moves all of the apparatus of the fork-forming means 240 horizontally away from the threading station 220 (see dotted line position FIG. 33) for the operation of further mechanism which will be described presently. Prior to the operation of the up-tucker 235 the pneumatic cylinder 241 is operated to move the fork-forming means 240 (in this embodiment approximately 1-inch) into position adjacent the threading station 220 (see full line position FIG. 31). With the fork-forming means 240 in the correct position the pneumatic cylinder 248 is operated to slide the block 250 and the jaws 251 and 253 into position directly above the threading station 220 and the ring 174 positioned therein (see dotted line position FIG. 31). When the up-tucker 235 is operated the free end of the strap material 225 is moved through the ring 174 and between the jaws 251 and 253 (see FIG. 30). With the free end of the strap material 225 between the jaws 251 and 253 the pneumatic cylinder 260 is operated to clamp the jaws 251 and 253 tightly onto the free end of the strap material (see full line position FIG. 30).

At this time a pneumatic cylinder 267, fixedly attached to the underside of the platform 185, is operated so that a rod 268 attached to the piston thereof moves upwardly through an opening 269 in the platform 185 directly below the block 250 (in its forward position). The rod 268 tilts the entire fork-forming means 240 about the pivotal mounting axis of the pneumatic cylinder 241 (as illustrated in dotted lines in FIGS. 15 and 32) and causes the jaws 251 and 253 to pull the strap material 255 upwardly through the ring 174 in the threading station 220. A limit switch 269 is attached to one of the plates 264 so as to be positioned directly above the upwardly projecting portion 259 of the block 250 when the block 250 is in its forward position. As the rod 268 moves the fork-forming means 240 upwardly the upwardly projecting portion 259 engages the limit switch 269 which de-energizes the pneumatic cylinder 267 and allows the fork-forming means 240 to return to the horizontal position. The limit switch 269 is mounted for vertical and horizontal adjustments so that the length of the strap material 225 drawn through the ring 174 can be adjusted. In this embodiment the fork-forming means 240 tilts so that the jaws 251 and 253 move vertically above the threading station 220 approximately an inch. With the return of the fork-forming means 240 to the horizontal position the pneumatic cylinder 248 is energized to move the block 250 away from the threading station 220 (see full line position FIG. 33).

Once the fork-forming means 240 has pulled the strap material 225 sufficiently to form the fork, clamping means generally designated 272 clamp the fork fixedly in the desired position. The clamping means 272 (see FIG. 17) includes a base member 273 slideably positioned within a groove in the upper surface of the platform 185 and attached to the piston of a pneumatic cylinder 274 by a rod 275 for longitudinal movement therewith. A support member 276 having a pair of vertically spaced apart horizontal arms 277 and 278 is mounted on the base member 273 with the arm 277 overlying the base member 273 and the arm 278 spaced vertically thereabove. A pair of guide rods 279 are affixed vertically between the arms 277 and 278 in a horizontally spaced apart realtionship. A clamping foot 280 is slideably engaged on the guide rods 279 for vertical movements between the arms 277 and 278. The clamping foot 280 is connected by a rod 282 to the piston of a pneumatic cylinder 281 which is mounted vertically on the arm 278. Actuation of the pneumatic cylinder 281 causes the clamping foot 280 to move downwardly against the arm 277 in tightly abuting overlying relationship.

The clamping means 272 is positioned on the platform 185 so as to lie approximately midway between the threading station 220 and the end of the track 224 (see FIG. 9). The clamping means 272 also extends along the platform 185 so as to lie between the threading station 220 and the jaws 251 and 253 of the fork-forming means 240. The clamping means 272 is further positioned so that strap material 225 fed to the threading station 220 from the track 224 passes over the lower arm 277 thereof and the free end of the strap material 225 pulled from the threading station 220 by the fork-forming means 240 is pulled over the lower arm 277 thereof. Thus, as illustrated in FIGS. 31-34, the arms of the fork extend over the lower arm 277 and actuation of the pneumatic cylinder 281 causes the clamping foot 280 to clamp the fork fixedly in position.

A knife blade 285 is affixed to the piston of a pneumatic cylinder 286 and positioned between the clamping means 272 and the end of the track 224. The knife blade 285 is further positioned so that the cutting edge thereof is approximately perpendicular to the longitudinal axis of the track 143 and, therefore, makes an angle of approximately 75° with the longitudinal axis of the track 224 (see FIGS. 31 and 33). Actuation of the pneumatic cylinder 286 causes the knife blade 285 to sever the fork from the source of strap material 225 so that the severed edge thereof lies approximately in a line with the edge at the free end of the strap material on the other arm of the fork (as illustrated in FIG. 33 with the end of the other arm in dotted lines). Each time a new fork is formed the edge at the free end of the strap material 225 is positioned so that it lies approximately perpendicular to the longitudinal axis of the track 143 and in a line with the cutting edge of the knife blade 285. It should be understood that the angle of the fork can vary considerably according to the uses thereof and the size of material and the present angles are only utilized for illustrative purposes.

A portion 291 of the track 143 adjacent the end thereof and on the side adjacent a sewing machine 289 (see FIGS. 9 and 14) is disconnected from the remainder of the track 143 and attached to the shaft 292 of a rotary pneumatic motor 293 for pivotal movement about an axis parallel with and spaced above the longitudinal axis of the track 143. The rotary pneumatic motor 293 is energized just prior to the energization of the pneumatic cylinder 274 so that the portion 291 of the track 143 is rotated upwardly out of engagement with the ring 174 positioned in the threading station 220 and having the fork threaded therethrough (see FIGS. 33 and 34). The rotary upward movement of the portion 291 allows the fork to move freely onto the sewing machine 289.

With the fork severed from the source of strap material 225 and the portion 291 of the track 143 rotated upwardly, the pneumatic cylinder 241 on the fork-forming means 240 is energized to move the entire fork-forming means 240 rearwardly out of the path of the clamping means 272. Upon the removal of the fork-forming means 240 the pneumatic cylinder 274 of the clamping means 272 is energized to slide the clamping means 272 adjacent the sewing machine 289 (see FIGS. 34 and 35). The sewing machine 289 is fixedly mounted on the base 40 adjacent the threading station 220 and opposite the clamping means 272 so that longitudinal movement of the clamping means 272 moves the fork into the desired position beneath a pressure foot 290 on the sewing machine (as illustrated in FIG. 35).

Once the pressure foot 290 of the sewing machine 289 is energized the clamping foot 280 of the clamping means 272 is released and the pressure on the pneumatic cylinder 274 is reversed to return the clamping means 272 to its normal position. Upon completing the sewing operation on the fork the pressure foot 290 of the sewing machine 289 releases the finished shoulder strap and the shoulder strap is free to drop into a container therebelow positioned to receive the same.

Thus, apparatus has been described which assembles a complete and adjustable shoulder strap for women's garments. No human labor is required throughout the operation of the apparatus and each of the various pneumatic cylinders described is sequentially operated by some timing means, such as cams and switches, electronic timers, etc. It should also be understood that the use of pneumatic cylinders is optional and many other types of motivating devices might be utilized, such as electrical solenoids, electrical motors, hydraulic cylinders, etc. Also, the particular position, lengths, etc. are optional and may be altered for various types of shoulder straps. The completed shoulder straps are ready to be sewn onto the ladies' garments and require no additional operations except the attachment thereon. In addition to being faster than assembling the shoulder straps by hand (several shoulder straps are processed simultaneously in the apparatus), the finished product is superior to any hand assembled shoulder straps because the buckles are fixedly attached thereto and because the ends of the fork lie in a substantially straight line. Positioning the ends of each of the forks in a straight line enhances the operation of connecting them to a garment and reduces the uncomfortable bulges on the garment.

While we have shown and described a specific embodiment of this invention, further modifications and improvements will occur to those skilled in the art. We desire it to be understood, therefore, that this invention is not limited to the particular form shown and we intend to cover all modifications which do not depart from the spirit and scope of this invention.

What is claimed is:

1. Apparatus for assembling a complete, adjustable shoulder strap for women's garments comprising:
   (a) buckle threading means for threading one end of a measured length of strap material through a buckle having a pair of openings therethrough so as to encircle a portion of the buckle;
   (b) first transfer means for removing said threaded buckle from said buckle threading means;
   (c) first fastening means positioned to receive said threaded buckle from said buckle threading means and for fixedly fastening said one end of said strap material in said encircling position on said buckle;
   (d) a buckle and ring threading station;
   (e) second transfer means for removing said buckle and fastened strap material from said fastening means and positioning said buckle and fastened strap material in said buckle and ring threading station;
   (f) means for receiving and positioning a ring in said buckle and ring threading station;
   (g) buckle and ring threading means for threading the other end of said measured length of strap material through said ring and both openings of said buckle to provide an adjustable strap having said ring slideably engaged at one end thereof and the other end adapted to be affixed to a women's garment;
   (h) a ring threading station;
   (i) third transfer means for removing said ring and buckle from said buckle and ring threading station and positioning said ring in said ring threading station;
   (j) fork forming and threading means for threading a second measured length of strap material through said ring and forming said second length of strap material into a fork;
   (k) second fastening means;
   (l) fourth transfer and clamping means for removing said ring from said ring threading station and positioning said fork in said second fastening means to fixedly fasten said fork in encircling engagement through said ring; and
   (m) motivating means attached to each of said means for automatically and sequentially causing each of said means to operate.

2. Apparatus as set forth in claim 1 wherein the buckle threading means has operatively associated therewith a magazine adapted to be supplied with a plurality of buckles and measuring and severing means adapted to have a source of strap material supplied thereto for measuring and severing the measured lengths of strap material from said source and positioning said measured length in said buckle threading means.

3. Apparatus as set forth in claim 1 wherein the first fastening means includes a sewing machine having a pivotally mounted sewing station affixed thereto for receiving the threaded buckle and sewing the strap material in a first position of said sewing station and releasing the buckle and fastened strap material in a second position.

4. Apparatus as set forth in claim 1 wherein the portion of the buckle encircled by the measured length of strap material is a central portion lying between the pair of openings through the buckle.

5. Apparatus as set forth in claim 1 wherein the second transfer means includes mechanism for positioning the other end of the measured length of strap material in a predetermined position relative to the buckle for the threading thereof by said buckle and ring threading means.

6. Apparatus as set forth in claim 5 including in addition gripping and pulling means positioned adjacent the buckle and ring threading means for receiving the other end of the measured length of strap material after threading thereof through the ring and buckle and pulling said other end a predetermined distance to form the shoulder strap.

7. Apparatus as set forth in claim 1 having in addition material feeding means adapted to have a second source of strap material supplied thereto for positioning the end of the second source adjacent the opening through the ring at the ring threading station.

8. Apparatus as set forth in claim 7 wherein the fork forming and threading means includes gripping and pulling means positioned adjacent the ring threading station for receiving the end of the second source of strap material after threading thereof through the ring and for pulling said end of said second source generally axially away from said ring and subsequently pulling said end of said second source away from said ring at a desired angle to the direction of feeding of said second source.

9. Apparatus as set forth in claim 7 having in addition means for severing the fork from the second source of material, said severing means being positioned to sever said fork from the second source so that the ends of said fork lie in a substantially straight line.

10. Apparatus for assembling a buckle on a length of strap material comprising:
   (a) a base;
   (b) a threading station mounted on said base;
   (c) a magazne adapted to be supplied with a plurality of buckles each having at least two openings therethrough, said magazine being mounted on said base adjacent said threading station and sequentially supplying buckles to said threading station;
   (d) strap material feeding means mounted on said base and adapted to be supplied with a source of strap material sequentially positioning the free end of the strap material adjacent at least one opening through a buckle positioned in said threading station;
   (e) a first tucker mounted on said base adjacent said threading station sequentially pushing the free end of the strap material through the one opening through the buckle;
   (f) a second tucker mounted on said base adjacent said threading station sequentially pushing the free end of the strap material through the other opening in the buckle;
   (g) a holding member mounted on said base for movement adjacent and away from said threading station and sequentially moving and holding the free end of the strap material against a portion of the strap material against a portion of the strap material immediately prior to the one opening;
   (h) a measuring member mounted on said base between said strap material feeding means and said threading station and having the strap material engaged therethrough, said measuring member being further mounted for sequential oscillatory movement a predetermined distance in a direction generally perpendicular to the direction of feed of the strap material;
(i) severing means mounted on said base adjacent said measuring member and sequentially severing the free end of the strap material from the source at a position determined by said measuring member;
(j) a sewing station pivotally mounted on said base and having a sewing machine operatively associated therewith for sequentially sewing the free end of the strap material through the one opening in the buckle;
(k) means for sequentially moving said threading station and said sewing station into juxtaposition and transferring the threaded buckle from said threading station to said sewing station;
(l) a transfer track having at least one end mounted adjacent said sewing station; and
(m) means for sequentially pivoting said sewing station and transferring the buckle and sewn strap material to said transfer track.

11. Apparatus for assembling a ring and a buckle having at least two openings therethrough and a predetermined length of strap material affixed thereto into an adjustable shoulder strap comprising:
(a) a base;
(b) transfer track mounted on said base and adapted to have the buckle slideably engaged therein with the affixed strap material extending downwardly;
(c) a threading station mounted on said base adjacent one end of said transfer track and adapted to receive buckles therefrom;
(d) means sequentially sliding the buckle a predetermined distance along said transfer track and into said threading station;
(e) a pin mounted on said base and movable into the path of the downwardly extending strap material for limiting the movement of the strap material during the sliding of the buckle;
(f) strap material positioning means mounted on said base below said transfer track for sequential movement generally parallel with and in approximately the same direction as the buckle sliding means to position the free end of the strap material below one opening through the buckle positioned in said threading station;
(g) a magazine adapted to be supplied with a plurality of rings, said magazine being mounted on said base adjacent said threading station and sequentially positioning rings in said threading station between the buckle positioned therein and the free end of the strap material positioned therebelow;
(h) a first tucker mounted on said base adjacent said threading station sequentially pushing the free end of the strap material through the ring and the one opening of the buckle;
(i) said pin being sequentially removable from the path of the strap material allowing the strap material to move into a downwardly extending position below the threading station;
(j) a second tucker mounted on said base adjacent said threading station sequentially pushing the free end of the strap material through the other opening of the buckle; and
(k) strap gripping jaws movably mounted on said base adjacent said threading station so as to receive the free end of the strap material therein from said second tucker and sequentially gripping said free end and moving a predetermined distance to pull said strap material through the buckle and the ring a desired amount.

12. Apparatus for assembling a connecting fork on an adjustable strap for women's garments comprising:
(a) a base;
(b) transfer track mounted on said base and adapted to have a ring with a strap assembled thereon slideably engaged therein;
(c) a threading station mounted on said base adjacent one end of said transfer track and adapted to receive rings therefrom;
(d) strap meaterial feeding means mounted on said base and adapted to be supplied with a source of strap material sequentially positioning the free end of the strap material adjacent a ring positioned in said threading station;
(e) a tucker mounted on said base adjacent said threading station sequentially pushing the free end of the strap material through the opening in the ring positioned in said threading station;
(f) strap gripping jaws movably mounted on said base adjacent said threading station so as to receive the free end of the strap material therein from said tucker and sequentially gripping said free end and moving a predetermined distance to pull the strap material through the ring a predetermined distance and at a desired angle to the direction of feed of said strap material feeding means;
(g) clamping means mounted on said base adjacent said threading station for clamping the threaded strap material in the desired angular position;
(h) severing means mounted on said base adjacent said clamping means for severing the threaded strap material from the source approximately along a line through the free end thereof;
(i) a sewing machine mounted on said base for sequentially sewing the threaded strap material adjacent the outer periphery of the ring to fixedly maintain the threaded strap material in the desired angular position; and
(j) means for sequentially moving said clamping means and said sewing machine into juxtaposition and transferring the threaded strap material to said sewing machine.

13. A method of producing complete, adjustable shoulder straps for women's garments including the steps of:
(a) providing a first supply of strap material, buckles having at least two openings therethrough and rings having a single opening therethrough;
(b) threading the free end of the strap material through both openings of a buckle and moving the free end into juxtaposition with the portion of the strap material adjacent the first threaded opening of the buckle to encircle the portion of the buckle between the openings;
(c) measuring said first strap material to a predetermined length and severing same from said supply to produce a shoulder strap portion of a desired length;
(d) sewing said free end to the remainder of said shoulder strap portion through said first opening in said buckle;
(e) positioning a ring at a second threading station;
(f) threading the severed end of the shoulder strap portion through the buckle openings and the ring to produce an adjustable shoulder strap;
(g) grasping the severed end and drawing the shoulder strap portion through the buckle and ring to a predetermined position for obtaining a desired length of the shoulder strap portion between the buckle and the ring;
(h) providing a second supply of strap material;
(i) threading the free end of the second strap material through the ring and positioning the portion of the second strap material leaving the ring at a predetermined angle to the portion of the second strap material entering the ring to form a fork;
(j) severing said fork from said second strap material so that the branches thereof are approximately of equal length and the ends lie in approximately a straight line; and (k) sewing the branches of the fork together adjacent the outer periphery of the ring.

14. A method of producing complete, adjustable shoulder straps for women's garments including the steps of:
(a) providing a first supply of strap material, buckles having at least two openings therethrough and rings having a single opening therethrough;
(b) positioning a buckle in a first threading station;
(c) positioning a free end of the first strap material so that it underlies the buckle openings;
(d) uptucking the free end of the first strap material through a first opening in the buckle;
(e) downtucking the free end of the first strap material through a second opening in the buckle;
(f) moving and holding the free end of the first strap material to a position underlying said first opening in the buckle;
(g) measuring said first strap material to a predetermined length and severing same from said supply to produce a shoulder strap portion of a desired length;
(h) transferring said buckle and shoulder strap portion to a sewing station while maintaining said free end in underlying relationship to said first opening in said buckle;
(i) sewing said free end to the remainder of said shoulder strap portion through said first opening in said buckle;
(j) transferring said buckle and shoulder strap portion to an intermediate station;
(k) positioning a ring at a second threading station;
(l) moving said buckle to said second threading station so that said opening therein overlies the opening through said ring and positioning the severed end of said shoulder strap portion in underlying relationship to the opening through said ring;
(m) uptucking said severed end of said shoulder strap portion through the opening in said ring and said second opening in said buckle;
(n) positioning said severed end of said shoulder strap portion in overlying relationship to said first opening in said buckle;
(o) downtucking said severed end of said shoulder strap portion through said first opening in said buckle;
(p) grasping said severed end and drawing said shoulder strap portion through said buckle and ring to a predetermined position for obtaining a desired length of said shoulder strap portion between said buckle and said ring;
(q) transferring said ring to a third threading station;
(r) providing a second supply of strap material;
(s) positioning the free end of said second strap material in underlying relationship to the opening in said ring while maintaining the longitudinal axis of said second strap material at a predetermined angle to the longitudinal axis of said shoulder strap portion;
(t) uptucking said free end of said second strap material through the opening in said ring;
(u) grasping and drawing said free end of said second strap material upwardly a predetermined amount and positioning said predetermined amount at a predetermined angle to the longitudinal axis of said second strap material to form a fork threaded through said ring;
(v) clamping said fork in the aforesaid position;
(w) severing said form from said second strap material so that the branches thereof are approximately of equal length;
(x) transferring said clamped and severed fork to a second sewing station;
(y) sewing said branches of said fork together adjacent said ring; and
(z) releasing said fork to provide a completed shoulder strap.

References Cited

UNITED STATES PATENTS

| | | | |
|---|---|---|---|
| 2,699,275 | 1/1955 | Mulligan | 223—49 |
| 2,955,730 | 10/1960 | Sonatag et al. | 223—49 |
| 3,150,804 | 9/1964 | Edelman | 223—49 |
| 3,422,999 | 1/1969 | Fischer | 223—49 |

MERVIN STEIN, Primary Examiner

GEORGE V. LARKIN, Assistant Examiner

U.S. Cl. X.R.

112—121.15